(12) United States Patent
Geisner et al.

(10) Patent No.: US 9,285,871 B2
(45) Date of Patent: Mar. 15, 2016

(54) PERSONAL AUDIO/VISUAL SYSTEM FOR PROVIDING AN ADAPTABLE AUGMENTED REALITY ENVIRONMENT

(75) Inventors: Kevin A. Geisner, Mercer Island, WA (US); Stephen G. Latta, Seattle, WA (US); Ben J. Sugden, Woodinville, WA (US); Benjamin I. Vaught, Seattle, WA (US); Alex Aben-Athar Kipman, Redmond, WA (US); Kathryn Stone Perez, Kirkland, WA (US); Ryan L. Hastings, Seattle, WA (US); Darren Bennett, Seattle, WA (US); Daniel J. McCulloch, Kirkland, WA (US); John Clavin, Seattle, WA (US); Jason Scott, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 467 days.

(21) Appl. No.: 13/431,135

(22) Filed: Mar. 27, 2012

(65) Prior Publication Data
US 2013/0083062 A1 Apr. 4, 2013

Related U.S. Application Data

(63) Continuation-in-part of application No. 13/250,878, filed on Sep. 30, 2011.

(51) Int. Cl.
*G06F 3/01* (2006.01)
*G02B 27/01* (2006.01)
(Continued)

(52) U.S. Cl.
CPC .............. *G06F 3/011* (2013.01); *G02B 27/017* (2013.01); *G06F 3/013* (2013.01);
(Continued)

(58) Field of Classification Search
CPC ....................................................... G09G 5/377
USPC .......................................................... 345/633
See application file for complete search history.

(56) References Cited

U.S. PATENT DOCUMENTS

| 5,772,508 A | 6/1998 | Sugita |
| 7,511,682 B2 | 3/2009 | Fuller et al. |

(Continued)

OTHER PUBLICATIONS

Ajanki, et al., "Contextual Information Access with Augmented Reality", In Proceedings of IEEE International Workshop on Machine Learning for Signal Processing, Aug. 29-Sep. 1, 2010, pp. 95-100.

(Continued)

*Primary Examiner* — Mark Zimmerman
*Assistant Examiner* — Vu Nguyen
(74) *Attorney, Agent, or Firm* — Dan Choi; Judy Yee; Micky Minhas

(57) ABSTRACT

A system for generating an augmented reality environment in association with one or more attractions or exhibits is described. In some cases, a see-through head-mounted display device (HMD) may acquire one or more virtual objects from a supplemental information provider associated with a particular attraction. The one or more virtual objects may be based on whether an end user of the HMD is waiting in line for the particular attraction or is on (or in) the particular attraction. The supplemental information provider may vary the one or more virtual objects based on the end user's previous experiences with the particular attraction. The HMD may adapt the one or more virtual objects based on physiological feedback from the end user (e.g., if a child is scared). The supplemental information provider may also provide and automatically update a task list associated with the particular attraction.

18 Claims, 26 Drawing Sheets

(51) Int. Cl.
*H04N 13/02* (2006.01)
*H04N 13/04* (2006.01)
*G09G 3/00* (2006.01)

(52) U.S. Cl.
CPC ........ *H04N 13/0271* (2013.01); *H04N 13/044* (2013.01); *G02B 2027/014* (2013.01); *G02B 2027/0138* (2013.01); *G02B 2027/0178* (2013.01); *G09G 3/003* (2013.01); *G09G 2354/00* (2013.01); *G09G 2380/00* (2013.01)

(56) References Cited

U.S. PATENT DOCUMENTS

| | | | |
|---|---|---|---|
| 7,603,112 | B2 | 10/2009 | Huomo et al. |
| 7,605,961 | B2 | 10/2009 | Klug |
| 8,432,489 | B2 | 4/2013 | Arseneau |
| 2005/0285878 | A1 | 12/2005 | Singh |
| 2006/0053377 | A1 | 3/2006 | Newell |
| 2006/0277474 | A1 | 12/2006 | Robarts |
| 2007/0013515 | A1* | 1/2007 | Johnson et al. ............ 340/568.1 |
| 2007/0024527 | A1 | 2/2007 | Heikkinen |
| 2007/0183430 | A1* | 8/2007 | Asmussen ................ 370/395.51 |
| 2008/0045138 | A1 | 2/2008 | Milic-Frayling et al. |
| 2008/0074424 | A1 | 3/2008 | Carignano |
| 2008/0147325 | A1 | 6/2008 | Maassel |
| 2008/0247014 | A1 | 10/2008 | Fein |
| 2009/0013052 | A1* | 1/2009 | Robarts et al. ................ 709/206 |
| 2009/0111434 | A1 | 4/2009 | Yu |
| 2009/0167787 | A1 | 7/2009 | Bathiche et al. |
| 2009/0182492 | A1 | 7/2009 | Alten |
| 2009/0237328 | A1 | 9/2009 | Gyorfi et al. |
| 2010/0130296 | A1 | 5/2010 | Ackley et al. |
| 2010/0131865 | A1 | 5/2010 | Ackley et al. |
| 2010/0240454 | A1 | 9/2010 | Xiao |
| 2010/0328344 | A1 | 12/2010 | Mattila |
| 2011/0035799 | A1* | 2/2011 | Handler ........................... 726/21 |
| 2011/0134108 | A1 | 6/2011 | Hertenstein |
| 2011/0141254 | A1 | 6/2011 | Roebke |
| 2011/0221656 | A1 | 9/2011 | Haddick |
| 2011/0225069 | A1 | 9/2011 | Cramer |
| 2011/0270135 | A1 | 11/2011 | Dooley |
| 2012/0120499 | A1* | 5/2012 | Harrison et al. .............. 359/631 |
| 2012/0218297 | A1* | 8/2012 | Ur ................................. 345/633 |
| 2012/0329432 | A1* | 12/2012 | Gupta et al. ................ 455/414.1 |
| 2013/0265333 | A1* | 10/2013 | Ainsworth et al. ........... 345/633 |

OTHER PUBLICATIONS

Walker, "Augmenting Amusement Rides with Telemetry," In the Proceedings of the 2007 ACM Conference on Advances in Computer entertainment Technology, 2007.

AR Walker—Augmented Reality Tour Guide, Published on: Oct. 15, 2010, Available at: http://tokyotek.com/ar-walker-augment-reality-tour-guide/.

Celentano, et al., "Observing and Adapting User Behavior in Navigational 3D Interfaces", In Proceedings of Working Conference on Advanced Visual Interfaces, May 25-28, 2004, pp. 275-282.

Chang, et al., "Dynamic User-centric Mobile Context Model", In Proceedings of Fifth International Conference on Digital Information Management, Jul. 5-8, 2010, pp. 442-447.

Liarokapis, et al., "Personalizing Virtual and Augmented Reality for Cultural Heritage Indoor and Outdoor Experiences", In Proceedings of The 9th International Symposium on Virtual Reality, Archaeology and Cultural Heritage, 2008, pp. 1-8.

Oh, et al., "Camar: Context-aware Mobile Augmented Reality in Smart Space", In Proceedings of International Workshop on Ubiquitous Virtual Reality, 2009, pp. 48-51.

Park, et al., "Wearable Augmented Reality System Using Gaze Interaction", In Proceedings of 7th IEEE/ACM International Symposium on Mixed and Augmented Reality, Sep. 15-18, 2008, pp. 175-176.

Reardon, Marguerite, "Augmented Reality Comes to Mobile Phones", Published on: Sep. 29, 2010, Available at: http://news.cnet.com/8301-30686_3-20017965-266.html.

Shin, et al., "Unified Context-aware Augmented Reality Application Framework for User-Driven Tour Guides", In Proceedings of International Symposium on Ubiquitous Virtual Reality, Jul. 7-10, 2010, pp. 52-55.

Sung, Dan, "Augmented Reality in Action—Travel and Tourism", Published on: Mar. 2, 2011, Available at: http://www.pocket-lint.com/news/38806/augmented-reality-travel-tourism-apps.

Vlahakis, "Personalized Augmented Reality Touring of Archaeological Sites with Wearable and Mobile Computers."

Zhu, et al., "Personalized In-store E-Commerce with the PromoPad: an Augmented Reality Shopping Assistant", In Proceedings of Electronic Journal for E-commerce Tools and Applications, Feb. 2004, pp. 1-19.

Olwal, et al., "ASTOR: An Autostereoscopic Optical See-through Augmented Reality System", In Proceedings of International Symposium on Mixed and Augmented Reality, Oct. 5-8, 2005, pp. 24-27.

Quinn, Clark N., "Delivering the Dream Models for Intelligent Assistance", Published on: 2004, Available at:http://www.quinnovation.com/DeliveringModelsWP.pdf.

Response to Office Action dated Oct. 17, 2013, U.S. Appl. No. 13/250,878.

Office Action dated Jul. 26, 2013, U.S. Appl. No. 13/250,878.

Response to Office Action dated Jul. 23, 2014, U.S. Appl. No. 13/431,124.

Response to Office Action dated Jul. 29, 2014, U.S. Appl. No. 13/431,129.

Response to Office Action dated May 2, 2014, U.S. Appl. No. 13/250,878.

Office Action dated May 21, 2014, U.S. Appl. No. 13/250,878.
Office Action dated Apr. 23, 2014, U.S. Appl. No. 13/431,124.
Office Action dated May 1, 2014, U.S. Appl. No. 13/431,129.
Office Action dated Oct. 14, 2014, U.S. Appl. No. 13/431,124.
Response to Office Action dated Jan. 14, 2015, U.S. Appl. No. 13/431,124.
Office Action dated Feb. 18, 2015, U.S. Appl. No. 13/431,124.
Office Action dated Dec. 4, 2014, U.S. Appl. No. 13/431,129.
Response to Office Action dated May 15, 2015, U.S. Appl. No. 13/431,124.

* cited by examiner

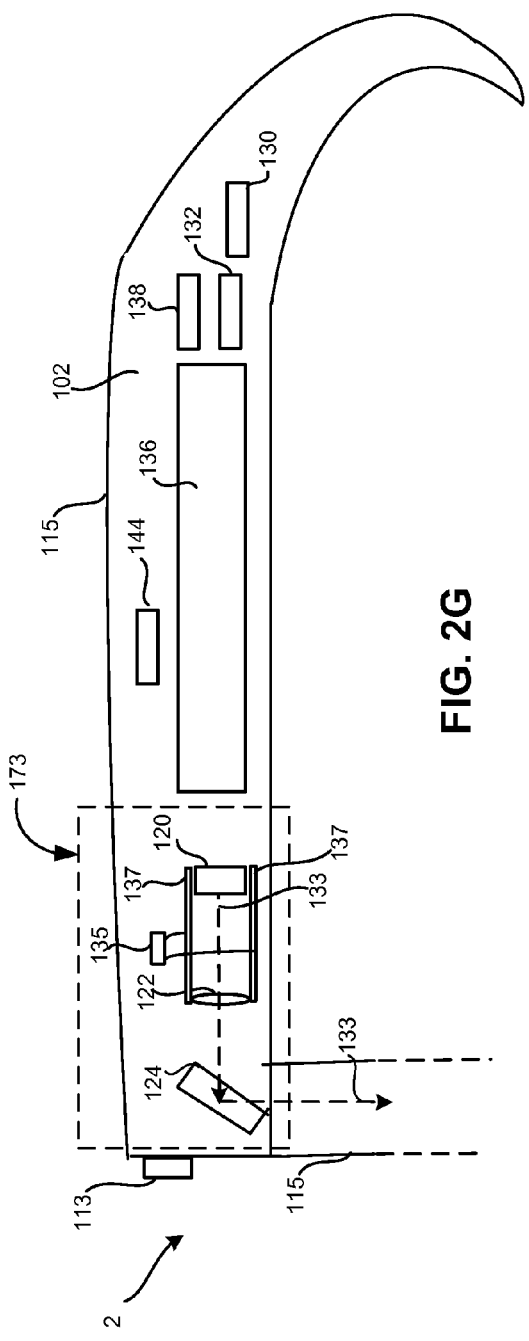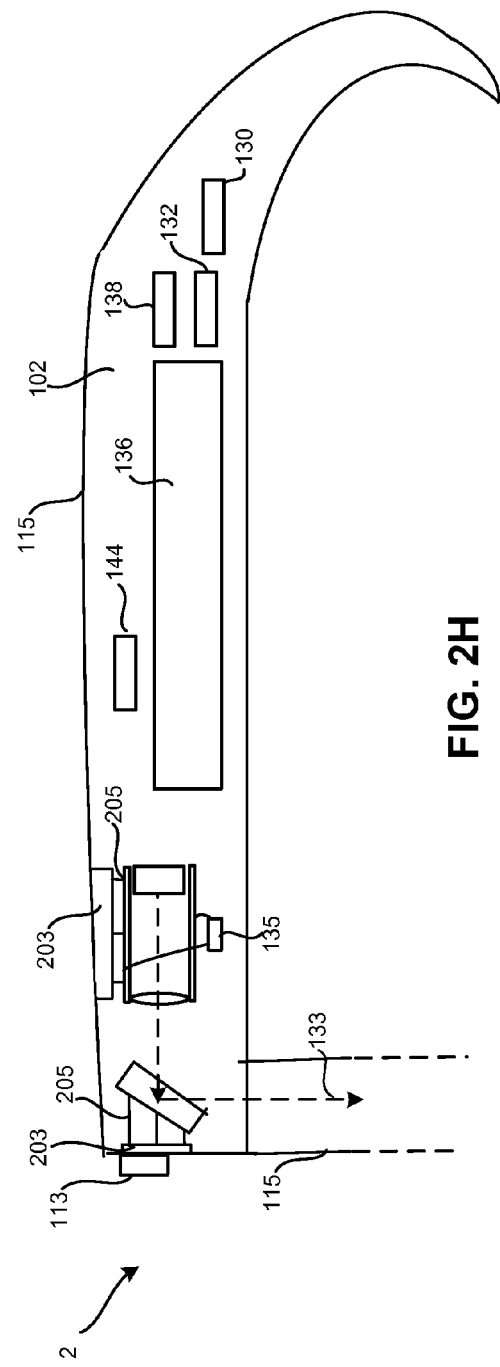

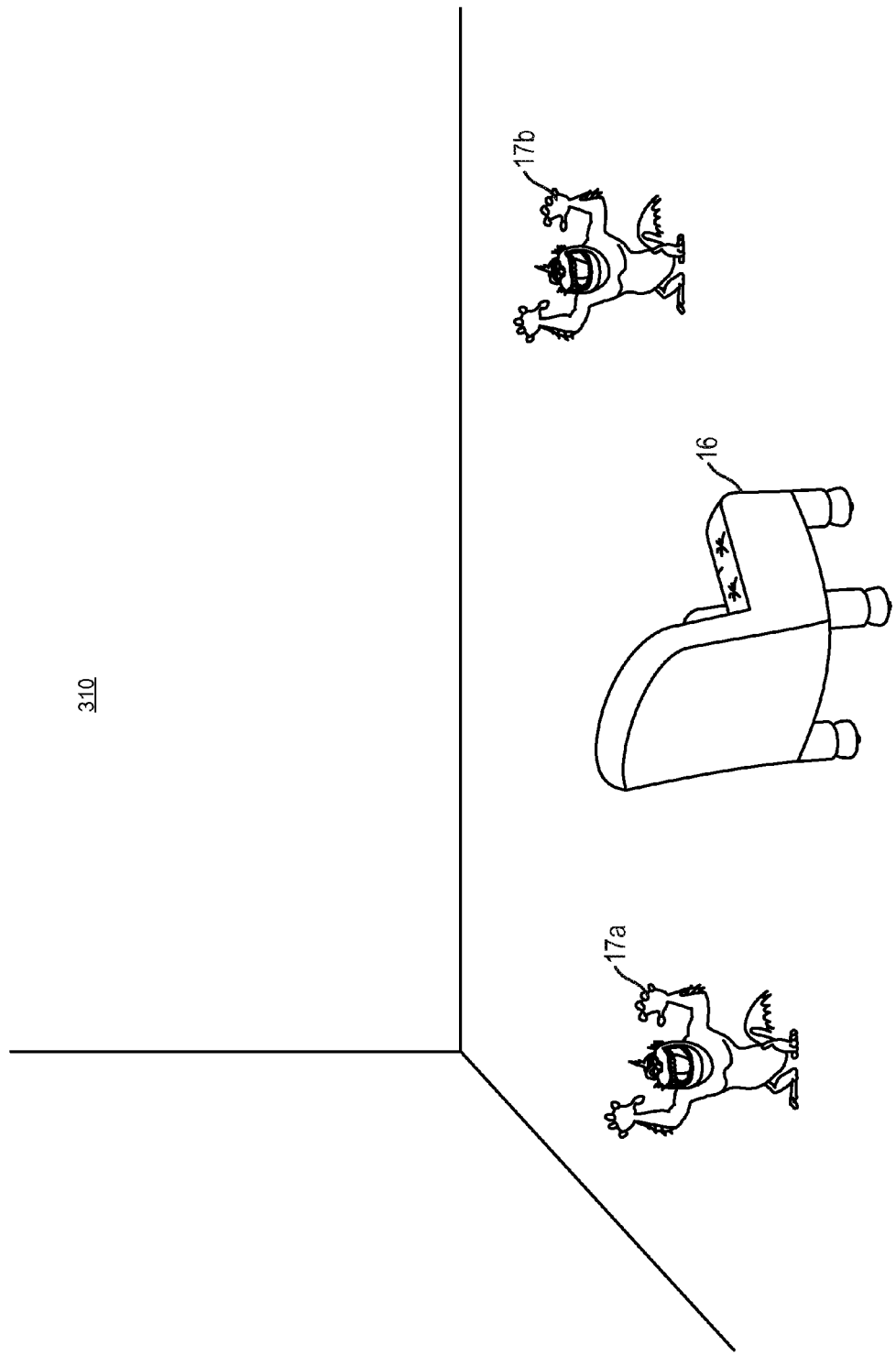

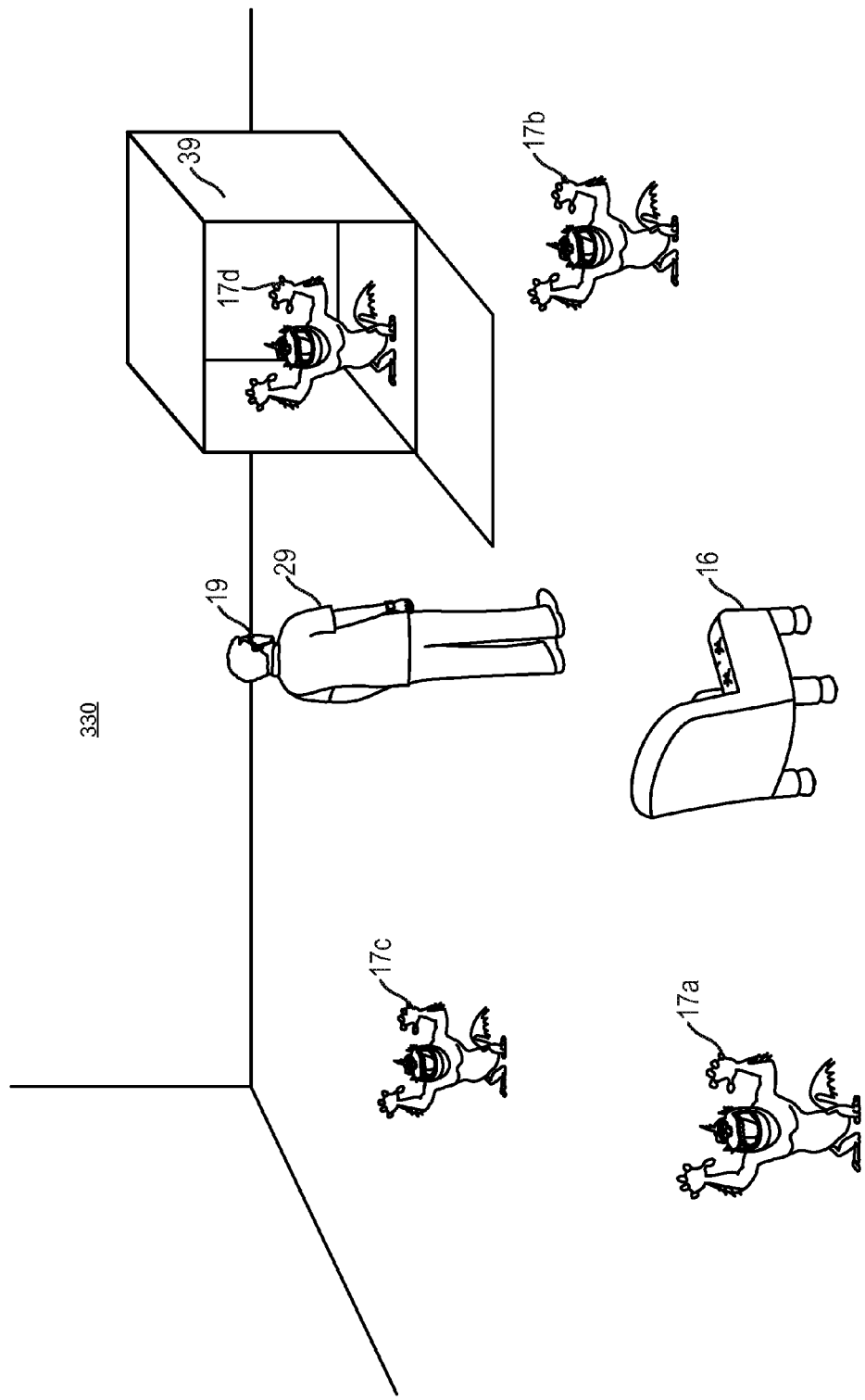

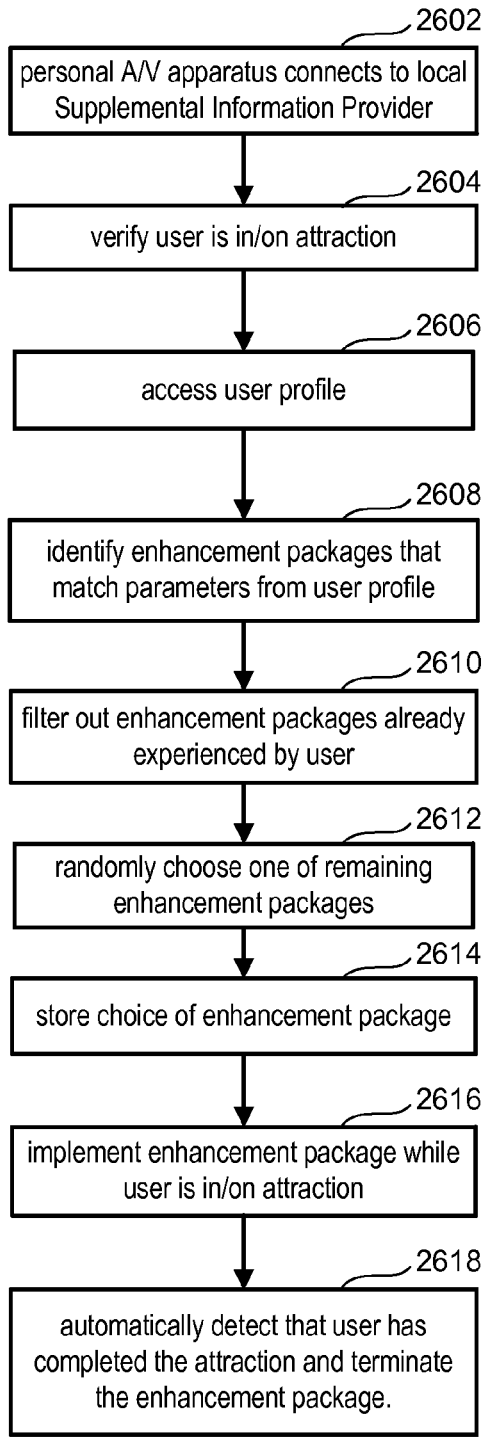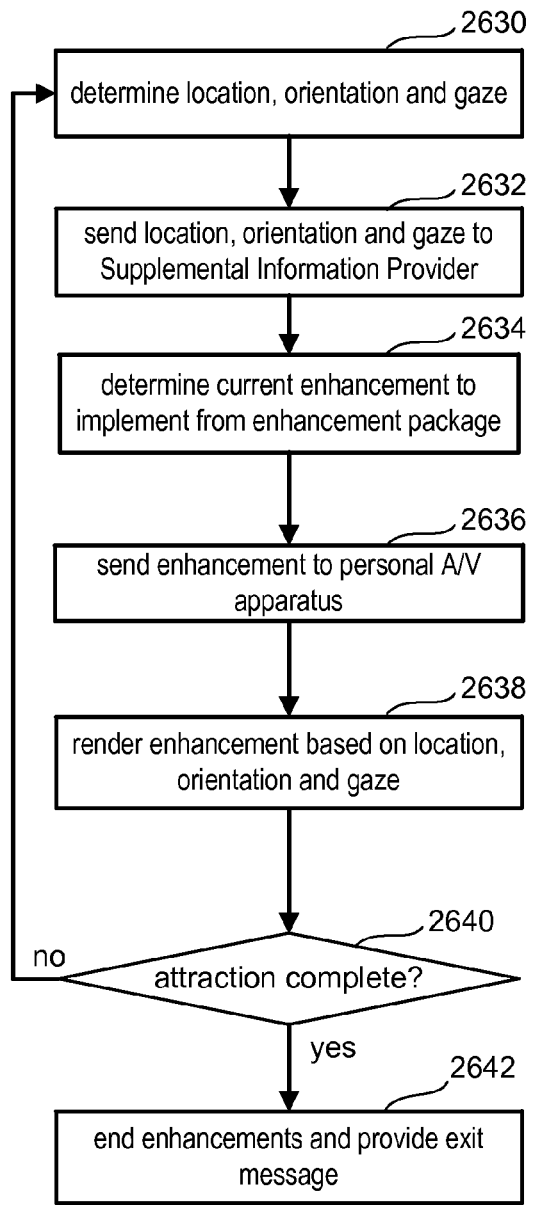
FIG. 7A
FIG. 7B

US 9,285,871 B2

PERSONAL AUDIO/VISUAL SYSTEM FOR PROVIDING AN ADAPTABLE AUGMENTED REALITY ENVIRONMENT

CLAIM OF PRIORITY

The present application is a continuation-in-part of U.S. patent application Ser. No. 13/250,878, entitled "Personal Audio/Visual System," filed Sep. 30, 2011, which is herein incorporated by reference in its entirety.

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. An AR environment may be used to enhance numerous applications including video game, mapping, navigation, and mobile device applications.

Some AR environments enable the perception of real-time interaction between real objects (i.e., objects existing in a particular real-world environment) and virtual objects (i.e., objects that do not exist in the particular real-world environment). In order to realistically integrate the virtual objects into an AR environment, an AR system typically performs several steps including mapping and localization. Mapping relates to the process of generating a map of the real-world environment. Localization relates to the process of locating a particular point of view or pose relative to the map. A fundamental requirement of many AR systems is the ability to localize the pose of a mobile device moving within a real-world environment in order to determine the particular view associated with the mobile device that needs to be augmented over time.

SUMMARY

Technology is described for generating an augmented reality environment while a person waits in line for an attraction or exhibit. In some cases, a see-through head-mounted display device (HMD) may acquire and display one or more virtual objects from a supplemental information provider for the attraction or exhibit upon detection that a user of the HMD is within a particular waiting area for the attraction or exhibit. The one or more virtual objects may be associated with the attraction or exhibit. The supplemental information provider may vary the one or more virtual objects based on the user's previous experiences with the attraction or exhibit. For example, if the user has visited the attraction or exhibit many times in the past, then the one or more virtual objects may be associated with experienced users of the attraction or exhibit. The one or more virtual objects may be disabled once the user has reached the front of the line or has exited the particular waiting area.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2G depicts one embodiment of a side view of a portion of an HMD.

FIG. 2H depicts one embodiment of a side view of a portion of an HMD which provides support for a three dimensional adjustment of a microdisplay assembly.

FIG. 3A depicts one embodiment of an augmented reality environment as seen by an end user wearing an HMD.

FIGS. 3D-3E depict one embodiment of an augmented reality environment including state-based virtual objects.

FIG. 7A is a flowchart describing one embodiment or a process for providing a personalized experience to a user at an attraction.

FIG. 7B is a flowchart describing one embodiment of a process for implementing an enhancement package while the user is in or on the attraction.

DETAILED DESCRIPTION

Technology is described for generating an augmented reality environment corresponding with one or more attractions or exhibits. The attractions or exhibits may include a ride at an amusement park or a museum exhibit. In some cases, a see-through head-mounted display device (HMD) may detect a supplemental information provider and acquire one or more virtual objects from the supplemental information provider associated with a particular attraction. The one or more virtual objects may be based on whether an end user of the HMD is waiting in line for the particular attraction or is on (or in) the particular attraction. The supplemental information provider may vary or adapt the one or more virtual objects based on the end user's previous experiences with the particular attraction. The HMD may adapt the one or more virtual objects based on physiological feedback from the end user. In one example, if the HMD determines that the end user is a child and is scared, then the one or more virtual objects may be slowed down, changed into less scary objects, or made transparent. In another example, if the HMD determines that the end user is an adult and is bored, then the one or more virtual objects may be sped up and changed into scarier objects. The supplemental information provider may also provide and automatically update in real-time a task list associated with the particular attraction.

With the advent and proliferation of continuously-enabled and network-connected mobile computing devices, such as head-mounted display devices (HMDs), the amount of information available to an end user of such computing devices at any given time is immense. In some cases, an augmented reality environment may be perceived by an end user of a mobile computing device. In one example, the augmented reality environment may comprise a personalized augmented reality environment wherein one or more virtual objects are generated and displayed based on an identification of the end user, user preferences associated with the end user, the physical location of the end user, or environmental features associated with the physical location of the end user. In one embodiment, the one or more virtual objects may be acquired by the mobile computing device via a supplemental information provider. To allow for the efficient storage and exchange of virtual objects, the one or more virtual objects may be embodied within a predetermined and standardized file format. Each virtual object of the one or more virtual objects may be associated with a plurality of different states. The current state of a virtual object may be determined via a state diagram encoded within the predetermined and standardized file format.

Figure 1:
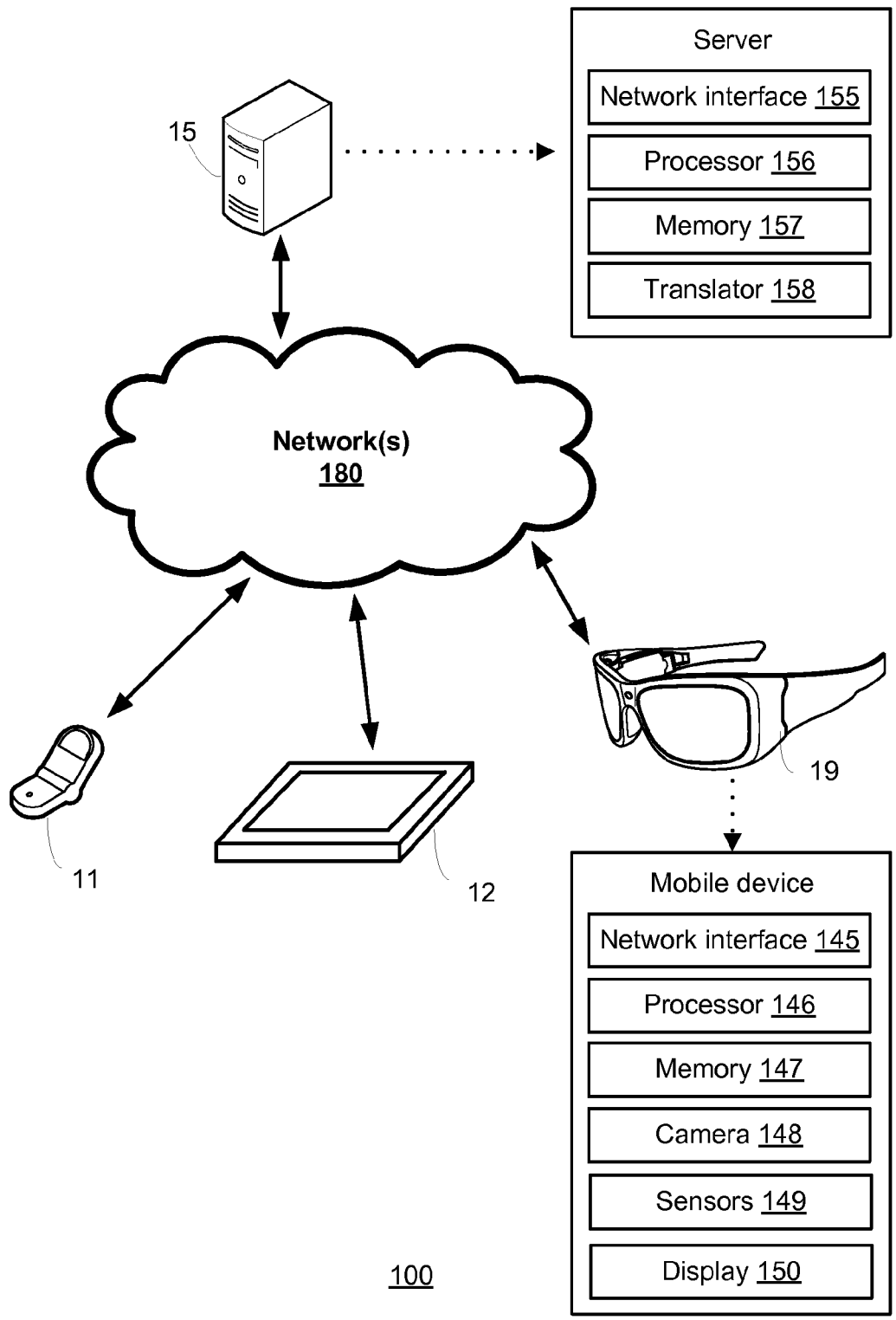
FIG. 1 is a block diagram of one embodiment of a networked computing environment in which the disclosed technology may be practiced.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 11, mobile device 12, mobile device 19, and server 15. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

Server 15, which may comprise a supplemental information server or an application server, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, memory 157, and translator 158, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein. Translator 158 may include mapping logic for translating a first file of a first file format into a corresponding second file of a second file format (i.e., the second file is a translated version of the first file). Translator 158 may be configured using file mapping instructions that provide instructions for mapping files of a first file format (or portions thereof) into corresponding files of a second file format.

One embodiment of mobile device 19 includes a network interface 145, processor 146, memory 147, camera 148, sensors 149, and display 150, all in communication with each other. Network interface 145 allows mobile device 19 to connect to one or more networks 180. Network interface 145 may include a wireless network interface, a modem, and/or a wired network interface. Processor 146 allows mobile device 19 to execute computer readable instructions stored in memory 147 in order to perform processes discussed herein. Camera 148 may capture color images and/or depth images. Sensors 149 may generate motion and/or orientation information associated with mobile device 19. Sensors 149 may comprise an inertial measurement unit (IMU). Display 150 may display digital images and/or videos. Display 150 may comprise a see-through display.

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one example, mobile device 19 comprises a head-mounted display device (HMD) that provides an augmented reality environment or a mixed reality environment for an end user of the HMD. The HMD may comprise a video see-through and/or an optical see-through system. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Utilizing the HMD, the end user may move around a real-world environment (e.g., a living room) wearing the HMD and perceive views of the real-world overlaid with images of virtual objects. The virtual objects may appear to maintain coherent spatial relationship with the real-world environment (i.e., as the end user turns their head or moves within the real-world environment, the images displayed to the end user will change such that the virtual objects appear to exist within the real-world environment as perceived by the end user). The virtual objects may also appear fixed with respect to the end user's point of view (e.g., a virtual menu that always appears in the top right corner of the end user's point of view regardless of how the end user turns their head or moves within the real-world environment). In one embodiment, environmental mapping of the real-world environment is performed by server 15 (i.e., on the server side) while camera localization is performed on mobile device 19 (i.e., on the client side). The virtual objects may include a text description associated with a real-world object. The virtual objects may also include virtual obstacles (e.g., non-movable virtual walls) and virtual targets (e.g., virtual monsters).

In some embodiments, a mobile device, such as mobile device 19, may be in communication with a server in the cloud, such as server 15, and may provide to the server location information (e.g., the location of the mobile device via GPS coordinates) and/or image information (e.g., information regarding objects detected within a field of view of the mobile device) associated with the mobile device. In response, the server may transmit to the mobile device one or more virtual objects based upon the location information and/or image information provided to the server. In one embodiment, the mobile device 19 may specify a particular file format for receiving the one or more virtual objects and server 15 may transmit to the mobile device 19 the one or more virtual objects embodied within a file of the particular file format.

Figure 2A:
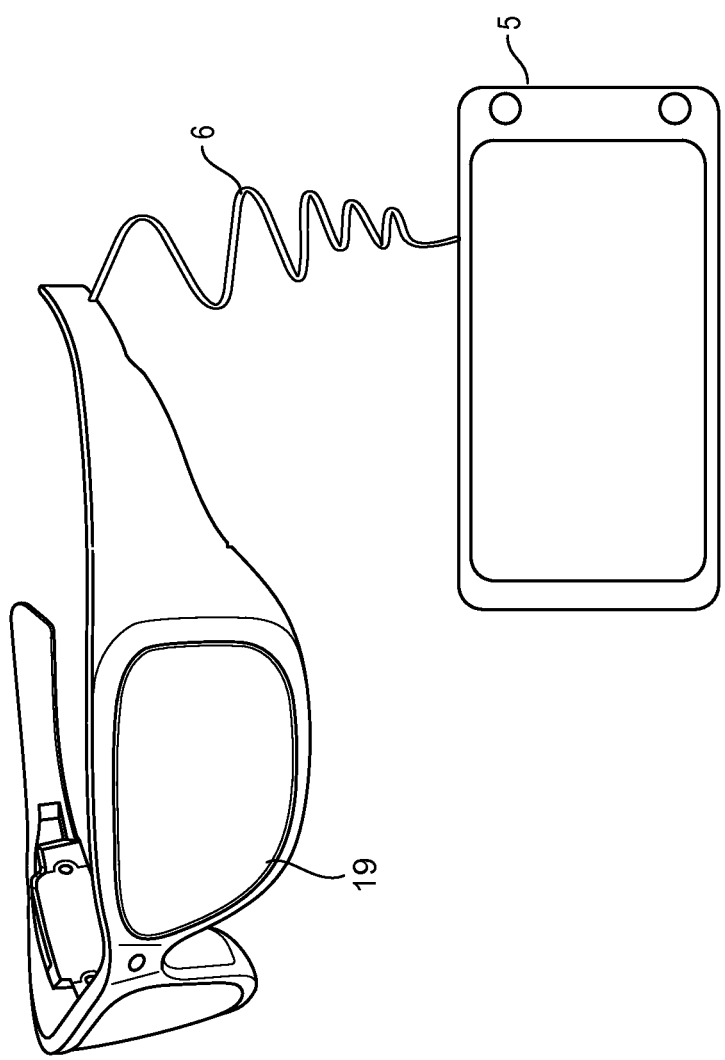
FIG. 2A depicts one embodiment of a mobile device in communication with a second mobile device.

FIG. 2A depicts one embodiment of a mobile device 19 in communication with a second mobile device 5. Mobile device 19 may comprise a see-through HMD. As depicted, mobile device 19 communicates with mobile device 5 via a wired connection 6. However, the mobile device 19 may also communicate with mobile device 5 via a wireless connection. Mobile device 5 may be used by mobile device 19 in order to offload compute intensive processing tasks (e.g., the rendering of virtual objects) and to store virtual object information and other data necessary to provide an augmented reality environment on mobile device 19.

Figure 2B:
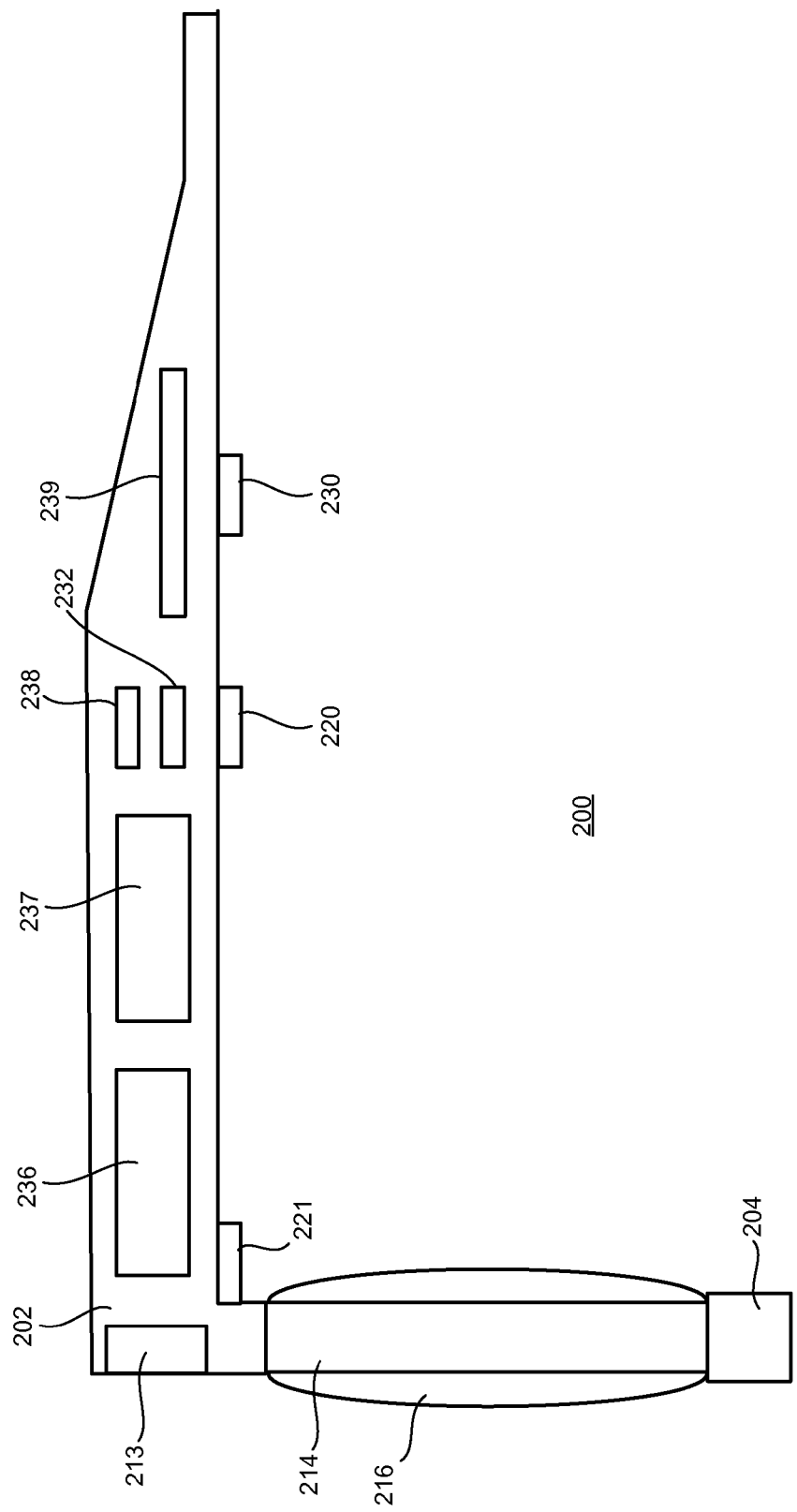
FIG. 2B depicts one embodiment of a portion of an HMD.

FIG. 2B depicts one embodiment of a portion of an HMD, such as mobile device 19 in FIG. 1. Only the right side of a head-mounted display device (HMD) 200 is depicted. HMD 200 includes right temple 202, nose bridge 204, eye glass 216, and eye glass frame 214. Right temple 202 includes a capture device 213 (e.g., a front facing camera and/or microphone) in communication with processing unit 236. The capture device 213 may include one or more cameras for recording digital images and/or videos and may transmit the visual recordings to processing unit 236. The one or more cameras may capture color information, IR information, and/or depth information. The capture device 213 may also include one or more microphones for recording sounds and may transmit the audio recordings to processing unit 236.

Right temple 202 also includes biometric sensor 220, eye tracking system 221, ear phones 230, motion and orientation sensor 238, GPS receiver 232, power supply 239, and wireless interface 237, all in communication with processing unit 236. Biometric sensor 220 may include one or more electrodes for determining a pulse or heart rate associated with an end user of HMD 200 and a temperature sensor for determining a body temperature associated with the end user of HMD 200. In one embodiment, biometric sensor 220 includes a pulse rate measuring sensor which presses against the temple of the end user. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, eye tracking system 221 may determine a blinking rate, a twitching eye movement, an overall pupil size, or a pupil size stability (or other metric associated with the rate of change of the pupil size with respect to lighting changes) associated with an eye of the end user. In some cases, the overall pupil size and the pupil size stability may indicate that the end user is scared or tired. In one embodiment, the eye tracking system 221 may include an inward facing camera. In another embodiment, the eye tracking system 221 may comprise an eye tracking illumination source and an associated eye tracking IR sensor. In one embodiment, the eye tracking illumination source may include one or more infrared (IR) emitters such as an infrared light emitting diode (LED) or a laser (e.g. VCSEL) emitting about a predetermined IR wavelength or a range of wavelengths. In some embodiments, the eye tracking sensor may include an IR camera or an IR position sensitive detector (PSD) for tracking glint positions. More information about eye tracking systems can be found in U.S. Pat. No. 7,401,920, entitled "Head Mounted Eye Tracking and Display System", issued Jul. 22, 2008, and U.S. patent application Ser. No. 13/245,700, entitled "Integrated Eye Tracking and Display System," filed Sep. 26, 2011, both of which are herein incorporated by reference.

In one embodiment, eye glass 216 may comprise a see-through display, whereby images generated by processing unit 236 may be projected and/or displayed on the see-through display. The capture device 213 may be calibrated such that a field of view captured by the capture device 213 corresponds with the field of view as seen by an end user of HMD 200. The ear phones 230 may be used to output sounds associated with the projected images of virtual objects. In some embodiments, HMD 200 may include two or more front facing cameras (e.g., one on each temple) in order to obtain depth from stereo information associated with the field of view captured by the front facing cameras. The two or more front facing cameras may also comprise 3-D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

In some embodiments, HMD 200 may perform gaze detection for each eye of an end user's eyes using gaze detection elements and a three-dimensional coordinate system in relation to one or more human eye elements such as a cornea center, a center of eyeball rotation, or a pupil center. Examples of gaze detection elements may include glint generating illuminators and sensors for capturing data representing the generated glints. In some cases, the center of the cornea can be determined based on two glints using planar geometry. The center of the cornea links the pupil center and the center of rotation of the eyeball, which may be treated as a fixed location for determining an optical axis of the end user's eye at a certain gaze or viewing angle.

Figure 2C:
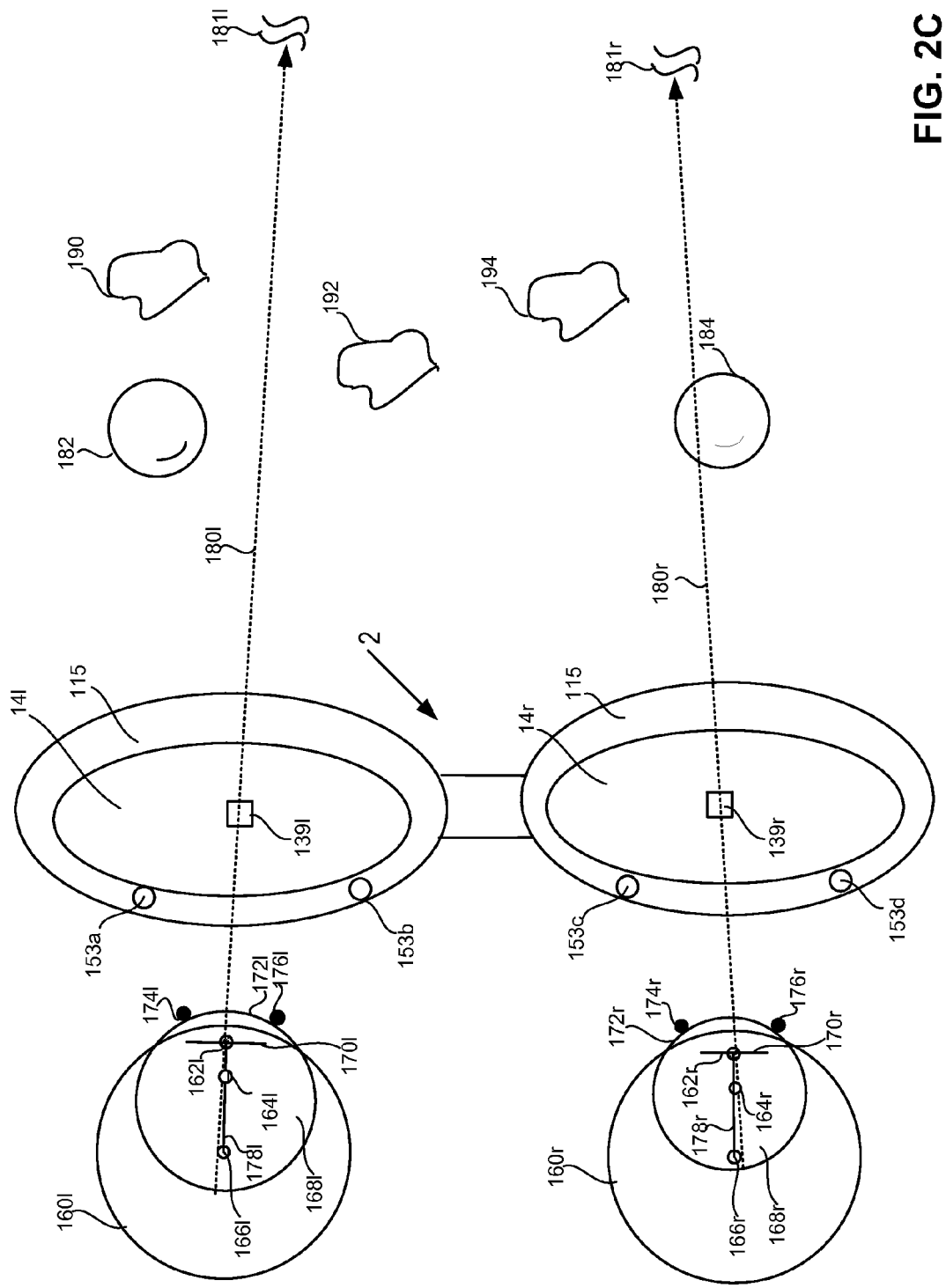
FIG. 2C depicts one embodiment of a portion of an HMD in which gaze vectors extending to a point of gaze are used for aligning a far inter-pupillary distance.

FIG. 2C depicts one embodiment of a portion of an HMD 2 in which gaze vectors extending to a point of gaze are used for aligning a far inter-pupillary distance (IPD). HMD 2 is one example of a mobile device, such as mobile device 19 in FIG. 1. As depicted, gaze vectors 180*l* and 180*r* intersect at a point of gaze that is far away from the end user (i.e., the gaze vectors 180*l* and 180*r* do not intersect as the end user is looking at an object far away). A model of the eyeball for eyeballs 160*l* and 160*r* is illustrated for each eye based on the Gullstrand schematic eye model. Each eyeball is modeled as a sphere with a center of rotation 166 and includes a cornea 168 modeled as a sphere having a center 164. The cornea 168 rotates with the eyeball, and the center of rotation 166 of the eyeball may be treated as a fixed point. The cornea 168 covers an iris 170 with a pupil 162 at its center. On the surface 172 of each cornea are glints 174 and 176.

As depicted in FIG. 2C, a sensor detection area 139 (i.e., 139*l* and 139*r*, respectively) is aligned with the optical axis of each display optical system 14 within an eyeglass frame 115. In one example, the sensor associated with the detection area may include one or more cameras capable of capturing image data representing glints 174*l* and 176*l* generated respectively by illuminators 153*a* and 153*b* on the left side of the frame 115 and data representing glints 174*r* and 176*r* generated respectively by illuminators 153*c* and 153*d* on the right side of the frame 115. Through the display optical systems 14*l* and 14*r* in the eyeglass frame 115, the end user's field of view includes both real objects 190, 192, and 194 and virtual objects 182 and 184.

The axis 178 formed from the center of rotation 166 through the cornea center 164 to the pupil 162 comprises the optical axis of the eye. A gaze vector 180 may also be referred to as the line of sight or visual axis which extends from the fovea through the center of the pupil 162. In some embodiments, the optical axis is determined and a small correction is determined through user calibration to obtain the visual axis which is selected as the gaze vector. For each end user, a virtual object may be displayed by the display device at each of a number of predetermined positions at different horizontal and vertical positions. An optical axis may be computed for each eye during display of the object at each position, and a ray modeled as extending from the position into the user's eye. A gaze offset angle with horizontal and vertical components may be determined based on how the optical axis must be moved to align with the modeled ray. From the different positions, an average gaze offset angle with horizontal or vertical components can be selected as the small correction to be applied to each computed optical axis. In some embodiments, only a horizontal component is used for the gaze offset angle correction.

As depicted in FIG. 2C, the gaze vectors 180*l* and 180*r* are not perfectly parallel as the vectors become closer together as they extend from the eyeball into the field of view at a point of gaze. At each display optical system 14, the gaze vector 180 appears to intersect the optical axis upon which the sensor detection area 139 is centered. In this configuration, the optical axes are aligned with the inter-pupillary distance (IPD). When an end user is looking straight ahead, the IPD measured is also referred to as the far IPD.

Figure 2D:
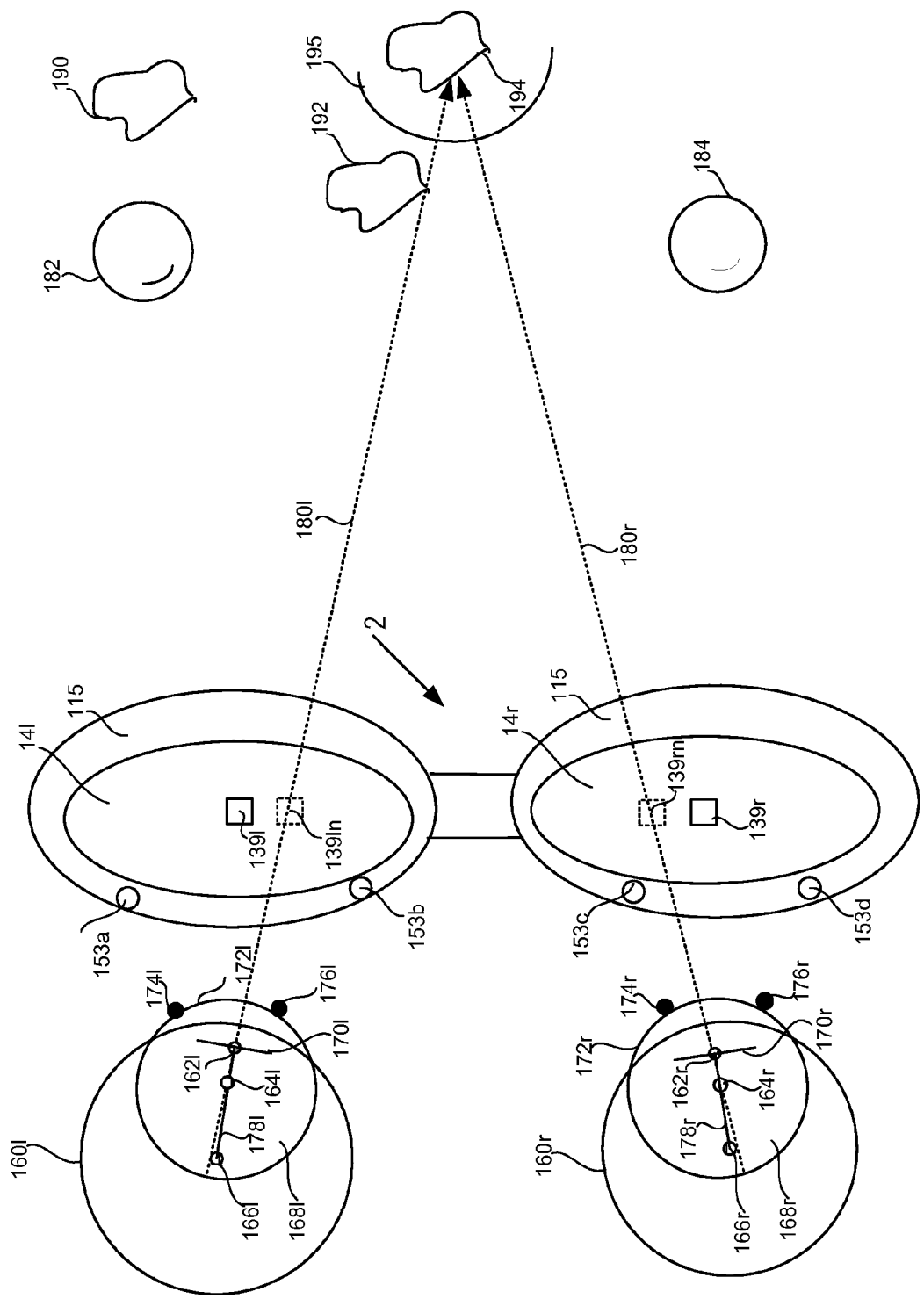
FIG. 2D depicts one embodiment of a portion of an HMD in which gaze vectors extending to a point of gaze are used for aligning a near inter-pupillary distance.

FIG. 2D depicts one embodiment of a portion of an HMD 2 in which gaze vectors extending to a point of gaze are used for aligning a near inter-pupillary distance (IPD). HMD 2 is one example of a mobile device, such as mobile device 19 in FIG. 1. As depicted, the cornea 168*l* of the left eye is rotated to the right or towards the end user's nose, and the cornea 168*r* of the right eye is rotated to the left or towards the end user's nose. Both pupils are gazing at a real object 194 within a particular distance of the end user. Gaze vectors 180*l* and 180*r* from each eye enter the Panum's fusional region 195 in which real object 194 is located. The Panum's fusional region is the area of single vision in a binocular viewing system like that of human vision. The intersection of the gaze vectors 180*l* and 180*r* indicates that the end user is looking at real object 194. At such a distance, as the eyeballs rotate inward, the distance between their pupils decreases to a near IPD. The near IPD is typically about 4 mm less than the far IPD. A near IPD distance criteria (e.g., a point of gaze at less than four feet from the end user) may be used to switch or adjust the IPD alignment of the display optical systems 14 to that of the near IPD. For the near IPD, each display optical system 14 may be moved toward the end user's nose so the optical axis, and detection area 139, moves toward the nose a few millimeters as represented by detection areas 139*ln* and 139*rn*.

More information about determining the IPD for an end user of an HMD and adjusting the display optical systems accordingly can be found in U.S. patent application Ser. No. 13/250,878, entitled "Personal Audio/Visual System," filed Sep. 30, 2011, which is herein incorporated by reference in its entirety.

Figure 2E:
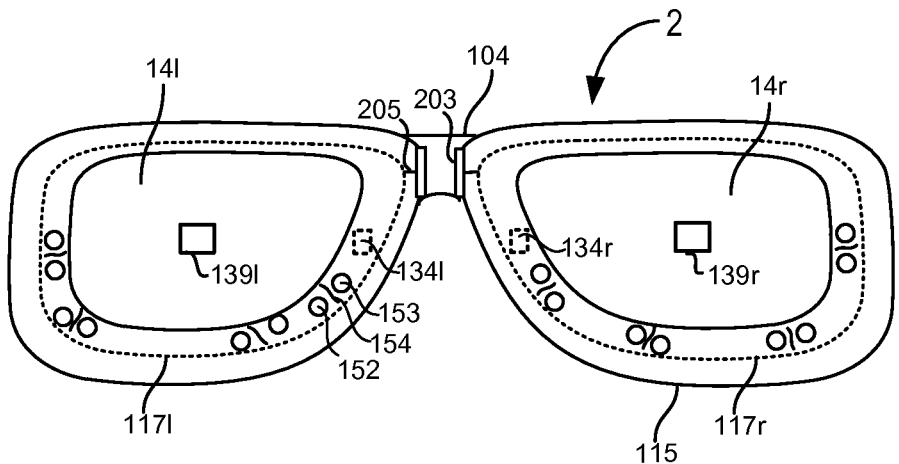
FIG. 2E depicts one embodiment of a portion of an HMD with movable display optical systems including gaze detection elements.

FIG. 2E depicts one embodiment of a portion of an HMD 2 with movable display optical systems including gaze detection elements. What appears as a lens for each eye represents a display optical system 14 for each eye (i.e., 14*l* and 14*r*). A display optical system includes a see-through lens and optical elements (e.g. mirrors, filters) for seamlessly fusing virtual content with the actual direct real world view seen through the lenses of the HMD. A display optical system 14 has an optical axis which is generally in the center of the see-through lens in which light is generally collimated to provide a distortionless view. For example, when an eye care professional fits an ordinary pair of eyeglasses to an end user's face, the glasses are usually fit such that they sit on the end user's nose at a position where each pupil is aligned with the center or optical axis of the respective lens resulting in generally collimated light reaching the end user's eye for a clear or distortionless view.

As depicted in FIG. 2E, a detection area 139*r*, 139*l* of at least one sensor is aligned with the optical axis of its respective display optical system 14*r*, 14*l* so that the center of the detection area 139*r*, 139*l* is capturing light along the optical axis. If the display optical system 14 is aligned with the end user's pupil, then each detection area 139 of the respective sensor 134 is aligned with the end user's pupil. Reflected light of the detection area 139 is transferred via one or more optical elements to the actual image sensor 134 of the camera, which in the embodiment depicted is illustrated by the dashed line as being inside the frame 115.

In one embodiment, the at least one sensor 134 may be a visible light camera (e.g., an RGB camera). In one example, an optical element or light directing element comprises a visible light reflecting mirror which is partially transmissive and partially reflective. The visible light camera provides image data of the pupil of the end user's eye, while IR photodetectors 152 capture glints which are reflections in the IR portion of the spectrum. If a visible light camera is used, reflections of virtual images may appear in the eye data captured by the camera. An image filtering technique may be used to remove the virtual image reflections if desired. An IR camera is not sensitive to the virtual image reflections on the eye.

In another embodiment, the at least one sensor 134 (i.e., 134l and 134r) is an IR camera or a position sensitive detector (PSD) to which the IR radiation may be directed. The IR radiation reflected from the eye may be from incident radiation of the illuminators 153, other IR illuminators (not shown), or from ambient IR radiation reflected off the eye. In some cases, sensor 134 may be a combination of an RGB and an IR camera, and the light directing elements may include a visible light reflecting or diverting element and an IR radiation reflecting or diverting element. In some cases, the sensor 134 may be embedded within a lens of the system 14. Additionally, an image filtering technique may be applied to blend the camera into a user field of view to lessen any distraction to the user.

As depicted in FIG. 2E, there are four sets of an illuminator 153 paired with a photodetector 152 and separated by a barrier 154 to avoid interference between the incident light generated by the illuminator 153 and the reflected light received at the photodetector 152. To avoid unnecessary clutter in the drawings, drawing numerals are shown with respect to a representative pair. Each illuminator may be an infra-red (IR) illuminator which generates a narrow beam of light at about a predetermined wavelength. Each of the photodetectors may be selected to capture light at about the predetermined wavelength. Infra-red may also include near-infrared. As there can be wavelength drift of an illuminator or photodetector or a small range about a wavelength may be acceptable, the illuminator and photodetector may have a tolerance range about a wavelength for generation and detection. In some embodiments where the sensor is an IR camera or IR position sensitive detector (PSD), the photodetectors may include additional data capture devices and may also be used to monitor the operation of the illuminators, e.g. wavelength drift, beam width changes, etc. The photodetectors may also provide glint data with a visible light camera as the sensor 134.

As depicted in FIG. 2E, each display optical system 14 and its arrangement of gaze detection elements facing each eye (e.g., such as camera 134 and its detection area 139, the illuminators 153, and photodetectors 152) are located on a movable inner frame portion 117l, 117r. In this example, a display adjustment mechanism comprises one or more motors 203 having a shaft 205 which attaches to the inner frame portion 117 which slides from left to right or vice versa within the frame 115 under the guidance and power of shafts 205 driven by motors 203. In some embodiments, one motor 203 may drive both inner frames.

Figure 2F:
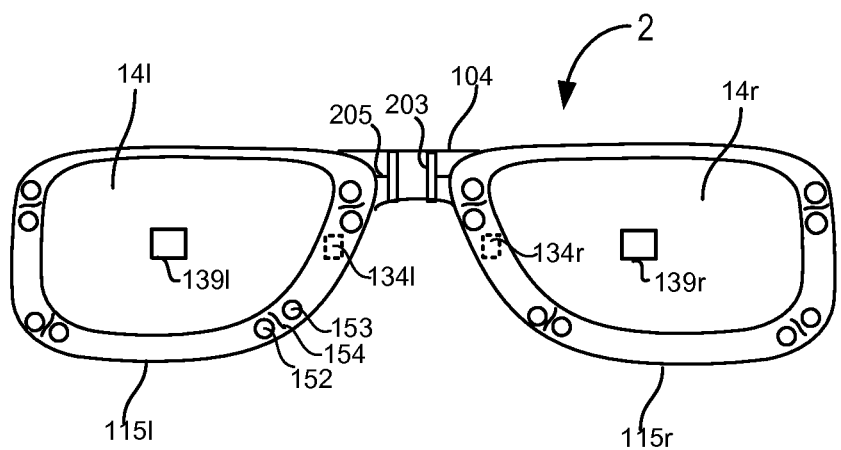
FIG. 2F depicts an alternative embodiment of a portion of an HMD with movable display optical systems including gaze detection elements.

FIG. 2F depicts an alternative embodiment of a portion of an HMD 2 with movable display optical systems including gaze detection elements. As depicted, each display optical system 14 is enclosed in a separate frame portion 115l, 115r. Each of the frame portions may be moved separately by the motors 203. More information about HMDs with movable display optical systems can be found in U.S. patent application Ser. No. 13/250,878, entitled "Personal Audio/Visual System," filed Sep. 30, 2011, which is herein incorporated by reference in its entirety.

FIG. 2G depicts one embodiment of a side view of a portion of an HMD 2 including an eyeglass temple 102 of the frame 115. At the front of frame 115 is a front facing video camera 113 that can capture video and still images. In some embodiments, front facing camera 113 may include a depth camera as well as a visible light or RGB camera. In one example, the depth camera may include an IR illuminator transmitter and a hot reflecting surface like a hot mirror in front of the visible image sensor which lets the visible light pass and directs reflected IR radiation within a wavelength range or about a predetermined wavelength transmitted by the illuminator to a CCD or other type of depth sensor. Other types of visible light cameras (e.g., an RGB camera or image sensor) and depth cameras can be used. More information about depth cameras can be found in U.S. patent application Ser. No. 12/813,675, filed on Jun. 11, 2010, incorporated herein by reference in its entirety. The data from the cameras may be sent to control circuitry 136 for processing in order to identify objects through image segmentation and/or edge detection techniques.

Inside temple 102, or mounted to temple 102, are ear phones 130, inertial sensors 132, GPS transceiver 144, and temperature sensor 138. In one embodiment, inertial sensors 132 include a three axis magnetometer, three axis gyro, and three axis accelerometer. The inertial sensors are for sensing position, orientation, and sudden accelerations of HMD 2. From these movements, head position may also be determined.

In some cases, HMD 2 may include an image generation unit which can create one or more images including one or more virtual objects. In some embodiments, a microdisplay may be used as the image generation unit. As depicted, microdisplay assembly 173 comprises light processing elements and a variable focus adjuster 135. An example of a light processing element is a microdisplay unit 120. Other examples include one or more optical elements such as one or more lenses of a lens system 122 and one or more reflecting elements such as surfaces 124. Lens system 122 may comprise a single lens or a plurality of lenses.

Mounted to or inside temple 102, the microdisplay unit 120 includes an image source and generates an image of a virtual object. The microdisplay unit 120 is optically aligned with the lens system 122 and the reflecting surface 124. The optical alignment may be along an optical axis 133 or an optical path 133 including one or more optical axes. The microdisplay unit 120 projects the image of the virtual object through lens system 122, which may direct the image light onto reflecting element 124. The variable focus adjuster 135 changes the displacement between one or more light processing elements in the optical path of the microdisplay assembly or an optical power of an element in the microdisplay assembly. The optical power of a lens is defined as the reciprocal of its focal length (i.e., 1/focal length) so a change in one effects the other. The change in focal length results in a change in the region of the field of view which is in focus for an image generated by the microdisplay assembly 173.

In one example of the microdisplay assembly 173 making displacement changes, the displacement changes are guided within an armature 137 supporting at least one light processing element such as the lens system 122 and the microdisplay 120. The armature 137 helps stabilize the alignment along the optical path 133 during physical movement of the elements to achieve a selected displacement or optical power. In some examples, the adjuster 135 may move one or more optical elements such as a lens in lens system 122 within the armature 137. In other examples, the armature may have grooves or space in the area around a light processing element so it slides over the element, for example, microdisplay 120, without moving the light processing element. Another element in the armature such as the lens system 122 is attached so that the system 122 or a lens within slides or moves with the moving armature 137. The displacement range is typically on the order of a few millimeters (mm). In one example, the range is 1-2 mm. In other examples, the armature 137 may provide support to the lens system 122 for focal adjustment techniques involving adjustment of other physical parameters than displacement. An example of such a parameter is polarization.

More information about adjusting a focal distance of a microdisplay assembly can be found in U.S. patent Ser. No. 12/941,825 entitled "Automatic Variable Virtual Focus for Augmented Reality Displays," filed Nov. 8, 2010, which is herein incorporated by reference in its entirety.

In one embodiment, the adjuster 135 may be an actuator such as a piezoelectric motor. Other technologies for the actuator may also be used and some examples of such technologies are a voice coil formed of a coil and a permanent magnet, a magnetostriction element, and an electrostriction element.

Several different image generation technologies may be used to implement microdisplay 120. In one example, microdisplay 120 can be implemented using a transmissive projection technology where the light source is modulated by optically active material and backlit with white light. These technologies are usually implemented using LCD type displays with powerful backlights and high optical energy densities. Microdisplay 120 can also be implemented using a reflective technology for which external light is reflected and modulated by an optically active material. The illumination may be forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the system described herein. Additionally, microdisplay 120 can be implemented using an emissive technology where light is generated by the display. For example, a PicoP™ engine from Microvision, Inc. emits a laser signal with a micro mirror steering either onto a tiny screen that acts as a transmissive element or beamed directly into the eye (e.g., laser).

FIG. 2H depicts one embodiment of a side view of a portion of an HMD 2 which provides support for a three dimensional adjustment of a microdisplay assembly. Some of the numerals illustrated in the FIG. 2G above have been removed to avoid clutter in the drawing. In some embodiments where the display optical system 14 is moved in any of three dimensions, the optical elements represented by reflecting surface 124 and the other elements of the microdisplay assembly 173 may also be moved for maintaining the optical path 133 of the light of a virtual image to the display optical system. An XYZ transport mechanism in this example made up of one or more motors represented by motor block 203 and shafts 205 under control of control circuitry 136 control movement of the elements of the microdisplay assembly 173. An example of motors which may be used are piezoelectric motors. In the illustrated example, one motor is attached to the armature 137 and moves the variable focus adjuster 135 as well, and another representative motor 203 controls the movement of the reflecting element 124.

FIGS. 3A-3E provide examples of various augmented reality environments in which one or more virtual objects are generated or adapted based on environmental features identified within various real-world environments. In some embodiments, the one or more virtual objects may include state-based virtual objects.

FIG. 3A depicts one embodiment of an augmented reality environment 310 as seen by an end user wearing an HMD, such as mobile device 19 in FIG. 1. The end user may view both real objects and virtual objects. The real objects may include a chair 16. The virtual objects may include virtual monsters 17a-b. As the virtual monsters 17a-b are displayed or overlaid over the real-world environment as perceived through the see-through lenses of the HMD, the end user of the HMD may perceive that the virtual monsters 17a-b exist within the real-world environment.

In some embodiments, an HMD may comprise a life recorder capable of performing life streaming. The life recorder may record images of a real-world environment along with virtual object information associated with one or more virtual objects experienced by an end user of the life recorder. In some cases, the end user's emotions or physical reactions to events within the real-world environment may be recorded and shared. More information about analyzing and sharing life experience using a life recorder can be found in U.S. patent application Ser. No. 13/031,033, entitled "Life Streaming," filed Feb. 18, 2011, which is herein incorporated by reference in its entirety.

Figure 3B:
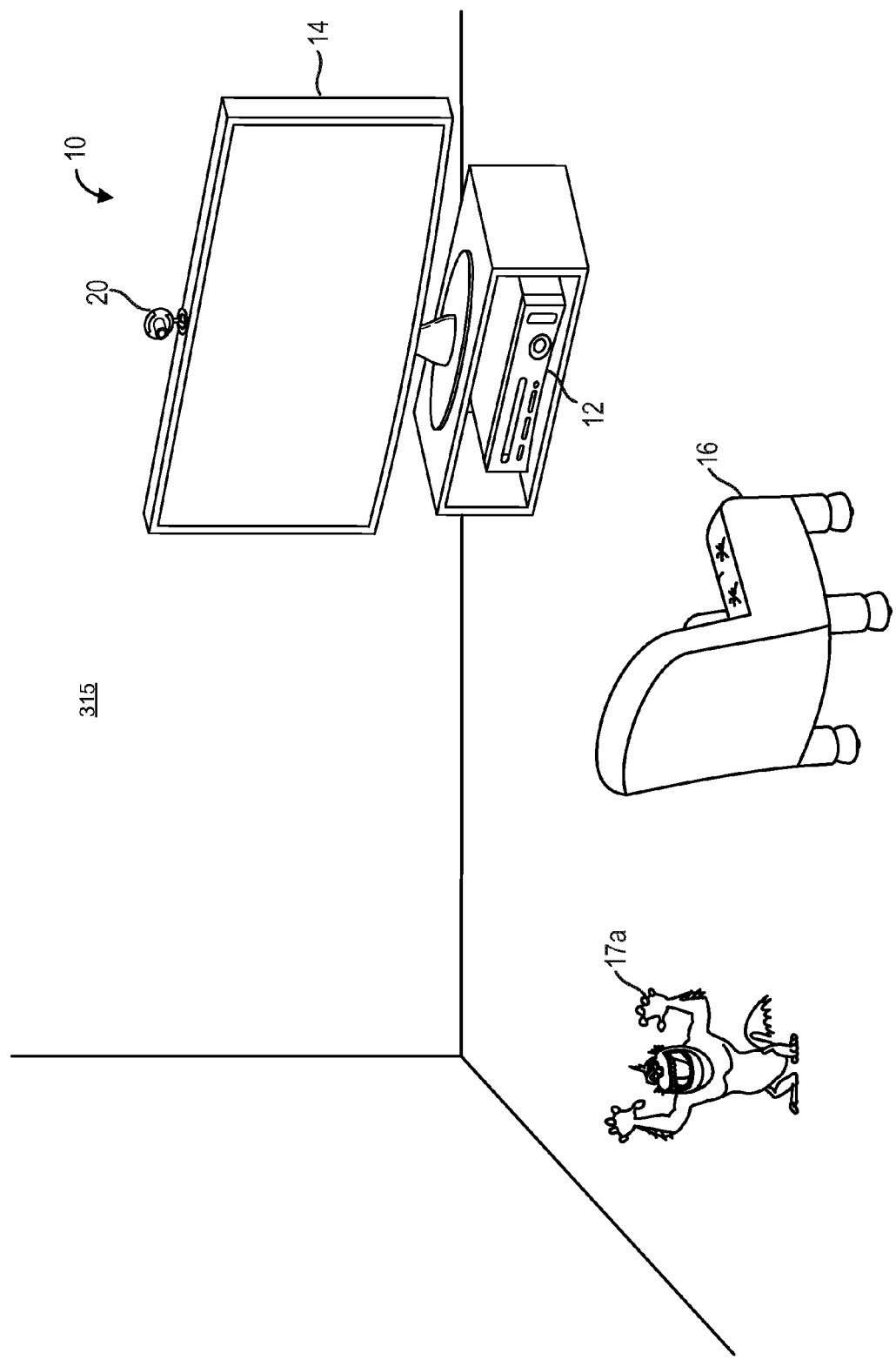
FIG. 3B depicts one embodiment of an augmented reality environment as seen by an end user wearing an HMD.

FIG. 3B depicts one embodiment of an augmented reality environment 315 as seen by an end user wearing an HMD, such as mobile device 19 in FIG. 1. The end user may view real objects and virtual objects. The real objects may include a chair 16 and a computing system 10. The virtual objects may include a virtual monster 17a. The computing system 10 may include a computing environment 12, a capture device 20, and a display 14, all in communication with each other. Computing environment 12 may include one or more processors. Capture device 20 may include one or more color or depth sensing cameras that may be used to visually monitor one or more targets including humans and one or more other real objects within a particular real-world environment. Capture device 20 may also include a microphone. In one example, capture device 20 may include a depth sensing camera and a microphone and computing environment 12 may comprise a gaming console. The computing system 10 may support multiple mobile devices or clients by providing them with virtual objects and/or mapping information regarding the real-world environment.

In some embodiments, the computing system 10 may track and analyze virtual objects within the augmented reality environment 315. The computing system 10 may also track and analyze real objects within the real-world environment corresponding with augmented reality environment 315. The rendering of images associated with virtual objects, such as virtual monster 17a, may be performed by computing system 10 or by the HMD. The computing system 10 may also provide 3-D maps associated with augmented reality environment 315 to the HMD.

In one embodiment, the computing system 10 may map the real-world environment associated with the augmented reality environment 315 (e.g., by generating a 3-D map of the real-world environment), and track both real objects and virtual objects within the augmented reality environment 315 in real-time. In one example, the computing system 10 provides virtual object information for a particular store (e.g., a clothing store or car dealership). Before an end user of an HMD enters the particular store, computing system 10 may have already generated a 3-D map including the static real-world objects inside the particular store. When the end user enters the particular store, the computing system 10 may begin tracking dynamic real-world objects and virtual objects within the augmented reality environment 315. The real-world objects moving within the real-world environment (including the end user) may be detected and classified using edge detection and pattern recognition techniques. The computing system may determine interactions between the real-world objects and the virtual objects and provide images of the virtual objects to the HMD for viewing by the end user as the end user walks around the particular store. In some embodiments, a 3-D map of the real-world environment including the static real-world objects inside the particular store may be transmitted to the HMD along with one or more virtual objects for use inside the particular store. The HMD may then determine interactions between real-world objects and the one or more virtual objects within the particular store and generate the augmented reality environment 315 locally on the HMD.

Figure 3C:
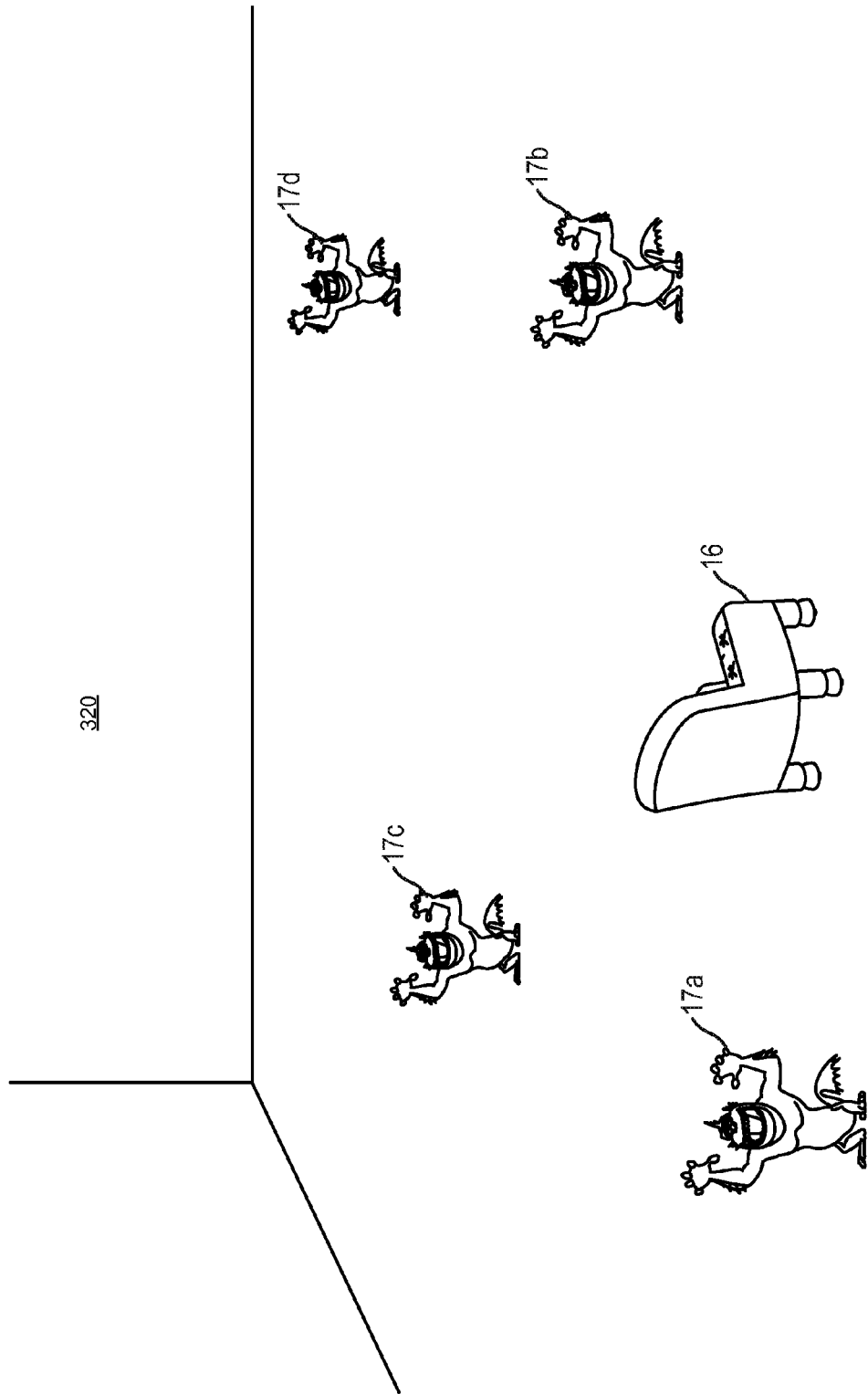
FIG. 3C depicts one embodiment of an augmented reality environment.

FIG. 3C depicts one embodiment of an augmented reality environment 320. The end user may view both real objects and virtual objects. The real objects may include a chair 16. The virtual objects may include virtual monsters 17a-d. As the virtual monsters 17a-d are displayed or overlaid over the real-world environment as perceived through the see-through lenses of the HMD, the end user of the HMD may perceive that the virtual monsters 17a-d exist within the real-world environment.

As depicted, the real-world environment associated with augmented reality environment 320 includes more open space compared with the real-world environment associated with augmented reality environment 310 in FIG. 3A. In some cases, in order to achieve a particular degree of difficulty associated with a gaming application, the larger amount of open space may require a greater number of virtual monsters to appear within augmented reality environment 320 (e.g., dodging four virtual monsters moving within a large real-world area may be deemed as difficult as dodging two virtual monsters within a smaller real-world area). However, in other gaming applications, a larger amount of open space may correspond with a more difficult gaming environment. More information about augmented reality environments with adaptive game rules can be found in U.S. patent application Ser. No. 13/288,350, entitled "Augmented Reality Playspaces With Adaptive Game Rules," filed Nov. 3, 2011, which is herein incorporated by reference in its entirety.

Figure 3D:
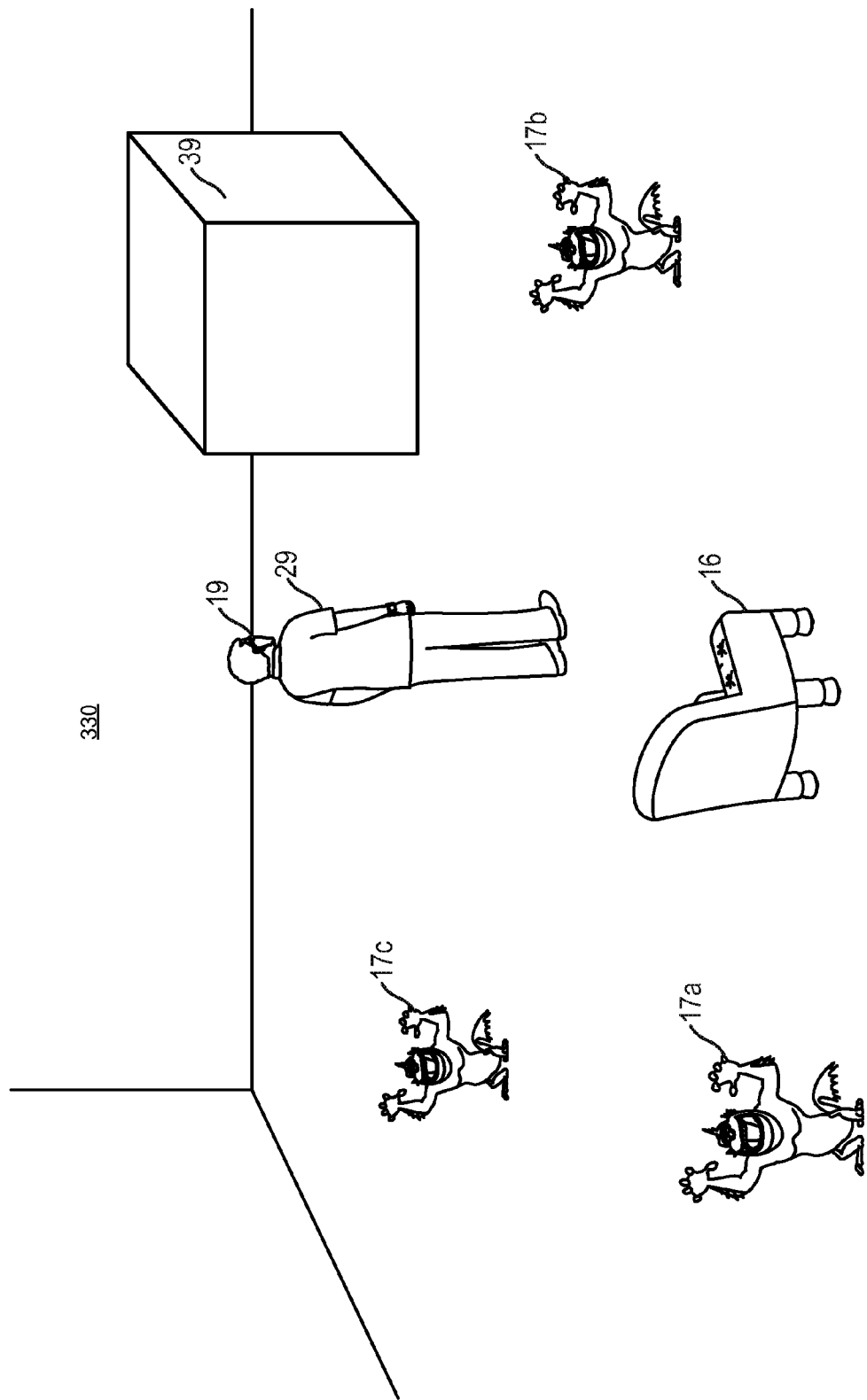

FIGS. 3D-3E depict one embodiment of an augmented reality environment 330 including state-based virtual objects. As depicted, the end user 29 of an HMD 19 may view both real objects and virtual objects. The real objects may include a chair 16. The virtual objects may include virtual monsters 17a-c and a state-based virtual object comprising virtual box 39. As the virtual objects are displayed or overlaid over the real-world environment as perceived through the see-through lenses of the HMD 19, the end user of the HMD 19 may perceive that the virtual objects exist within the real-world environment.

In one embodiment, end user 29 may view a state-based virtual object comprising virtual box 39. In a first state depicted in FIG. 3D, the virtual box appears to be closed. By staring at the virtual box 39 for a particular period of time and/or performing a particular physical gesture (e.g., a particular hand gesture), the virtual box 39 may transition from the first state depicted in FIG. 3D into a second state depicted in FIG. 3E. Once the virtual box 39 is set into the second state, the object's shape and/or other properties may be altered. As depicted, the virtual box 39 appears to be opened and a new virtual object (i.e., virtual monster 17d) is generated and displayed as existing within the augmented reality environment 330. In one example, in order to close the virtual box 39, the end user 29 may have to perform a different physical gesture than the particular physical gesture used to open the virtual box and/or issue a particular voice command. In some embodiments, the second state may correspond with a different 3-D model of the virtual object than the 3-D model associated with the first state (e.g., the second state may be associated with a deformed version of the virtual object in the first state). More information about augmented reality environments with state-based virtual objects can be found in U.S. patent application Ser. No. 13/430,972, entitled "Personal Audio/Visual System With Holographic Objects," filed Mar. 27, 2012, which is herein incorporated by reference in its entirety.

Figure 4:
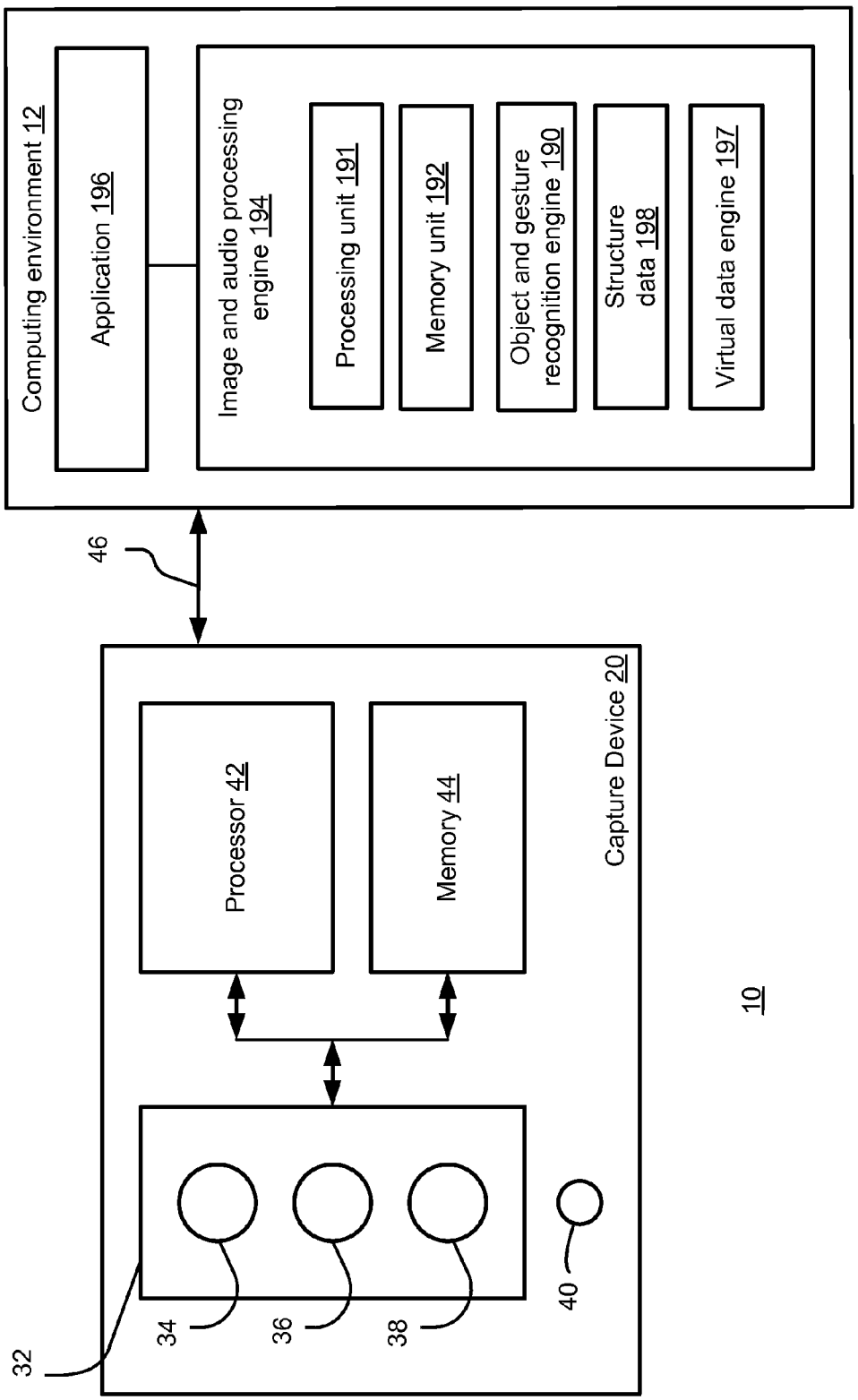
FIG. 4 illustrates one embodiment of a computing system including a capture device and computing environment.

FIG. 4 illustrates one embodiment of a computing system 10 including a capture device 20 and computing environment 12. In some embodiments, capture device 20 and computing environment 12 may be integrated within a single computing device. The single computing device may comprise a mobile device, such as mobile device 19 in FIG. 1. In some cases, the capture device 20 and computing environment 12 may be integrated within an HMD.

In one embodiment, the capture device 20 may include one or more image sensors for capturing images and videos. An image sensor may comprise a CCD image sensor or a CMOS image sensor. In some embodiments, capture device 20 may include an IR CMOS image sensor. The capture device 20 may also include a depth sensor (or depth sensing camera) configured to capture video with depth information including a depth image that may include depth values via any suitable technique including, for example, time-of-flight, structured light, stereo image, or the like.

The capture device 20 may include an image camera component 32. In one embodiment, the image camera component 32 may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the image camera component 32.

The image camera component 32 may include an IR light component 34, a three-dimensional (3-D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more objects in the capture area using, for example, the 3-D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the one or more objects in the capture area. Additionally, the phase of the outgoing light wave may be compared to the phase of the incoming light wave to determine a phase shift. The phase shift may then be used to determine a physical distance from the capture device to a particular location associated with the one or more objects.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more objects (or targets) in the capture area, the pattern may become deformed in response. Such a deformation of the pattern may be captured by, for example, the 3-D camera 36 and/or the RGB camera 38 and analyzed to determine a physical distance from the capture device to a particular location on the one or more objects. Capture device 20 may include optics for producing collimated light. In some embodiments, a laser projector may be used to create a structured light pattern. The light projector may include a laser, laser diode, and/or LED.

In some embodiments, two or more different cameras may be incorporated into an integrated capture device. For example, a depth camera and a video camera (e.g., an RGB video camera) may be incorporated into a common capture device. In some embodiments, two or more separate capture devices of the same or differing types may be cooperatively used. For example, a depth camera and a separate video camera may be used, two video cameras may be used, two depth cameras may be used, two RGB cameras may be used, or any combination and number of cameras may be used. In one embodiment, the capture device 20 may include two or more physically separated cameras that may view a capture area from different angles to obtain visual stereo data that may be resolved to generate depth information. Depth may also be determined by capturing images using a plurality of detectors that may be monochromatic, infrared, RGB, or any other type of detector and performing a parallax calculation. Other types of depth image sensors can also be used to create a depth image.

As depicted in FIG. 4, capture device 20 may include one or more microphones 40. Each of the one or more microphones 40 may include a transducer or sensor that may receive and convert sound into an electrical signal. The one or more microphones may comprise a microphone array in which the one or more microphones may be arranged in a predetermined layout.

The capture device 20 may include a processor 42 that may be in operative communication with the image camera component 32. The processor may include a standardized processor, a specialized processor, a microprocessor, or the like. The processor 42 may execute instructions that may include instructions for storing filters or profiles, receiving and analyzing images, determining whether a particular situation has occurred, or any other suitable instructions. It is to be understood that at least some image analysis and/or target analysis and tracking operations may be executed by processors contained within one or more capture devices such as capture device 20.

The capture device 20 may include a memory 44 that may store the instructions that may be executed by the processor 42, images or frames of images captured by the 3-D camera or RGB camera, filters or profiles, or any other suitable information, images, or the like. In one example, the memory 44 may include random access memory (RAM), read only memory (ROM), cache, Flash memory, a hard disk, or any other suitable storage component. As depicted, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 20 may be housed in a single housing.

The capture device 20 may be in communication with the computing environment 12 via a communication link 46. The communication link 46 may be a wired connection including, for example, a USB connection, a FireWire connection, an Ethernet cable connection, or the like and/or a wireless connection such as a wireless 802.11b, g, a, or n connection. The computing environment 12 may provide a clock to the capture device 20 that may be used to determine when to capture, for example, a scene via the communication link 46. In one embodiment, the capture device 20 may provide the images captured by, for example, the 3-D camera 36 and/or the RGB camera 38 to the computing environment 12 via the communication link 46.

As depicted in FIG. 4, computing environment 12 includes image and audio processing engine 194 in communication with application 196. Application 196 may comprise an operating system application or other computing application such as a gaming application. Image and audio processing engine 194 includes virtual data engine 197, object and gesture recognition engine 190, structure data 198, processing unit 191, and memory unit 192, all in communication with each other. Image and audio processing engine 194 processes video, image, and audio data received from capture device 20. To assist in the detection and/or tracking of objects, image and audio processing engine 194 may utilize structure data 198 and object and gesture recognition engine 190. Virtual data engine 197 processes virtual objects and registers the position and orientation of virtual objects in relation to various maps of a real-world environment stored in memory unit 192.

Processing unit 191 may include one or more processors for executing object, facial, and voice recognition algorithms. In one embodiment, image and audio processing engine 194 may apply object recognition and facial recognition techniques to image or video data. For example, object recognition may be used to detect particular objects (e.g., soccer balls, cars, people, or landmarks) and facial recognition may be used to detect the face of a particular person. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192. Processing unit 191 may execute computer readable instructions stored in memory unit 192 in order to perform processes discussed herein.

The image and audio processing engine 194 may utilize structural data 198 while performing object recognition. Structure data 198 may include structural information about targets and/or objects to be tracked. For example, a skeletal model of a human may be stored to help recognize body parts. In another example, structure data 198 may include structural information regarding one or more inanimate objects in order to help recognize the one or more inanimate objects.

The image and audio processing engine 194 may also utilize object and gesture recognition engine 190 while performing gesture recognition. In one example, object and gesture recognition engine 190 may include a collection of gesture filters, each comprising information concerning a gesture that may be performed by a skeletal model. The object and gesture recognition engine 190 may compare the data captured by capture device 20 in the form of the skeletal model and movements associated with it to the gesture filters in a gesture library to identify when a user (as represented by the skeletal model) has performed one or more gestures. In one example, image and audio processing engine 194 may use the object and gesture recognition engine 190 to help interpret movements of a skeletal model and to detect the performance of a particular gesture.

In some embodiments, one or more objects being tracked may be augmented with one or more markers such as an IR retroreflective marker to improve object detection and/or tracking. Planar reference images, coded AR markers, QR codes, and/or bar codes may also be used to improve object detection and/or tracking. Upon detection of one or more objects and/or gestures, image and audio processing engine 194 may report to application 196 an identification of each object or gesture detected and a corresponding position and/or orientation if applicable.

More information about detecting and tracking objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about object and gesture recognition engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

Figure 5A:
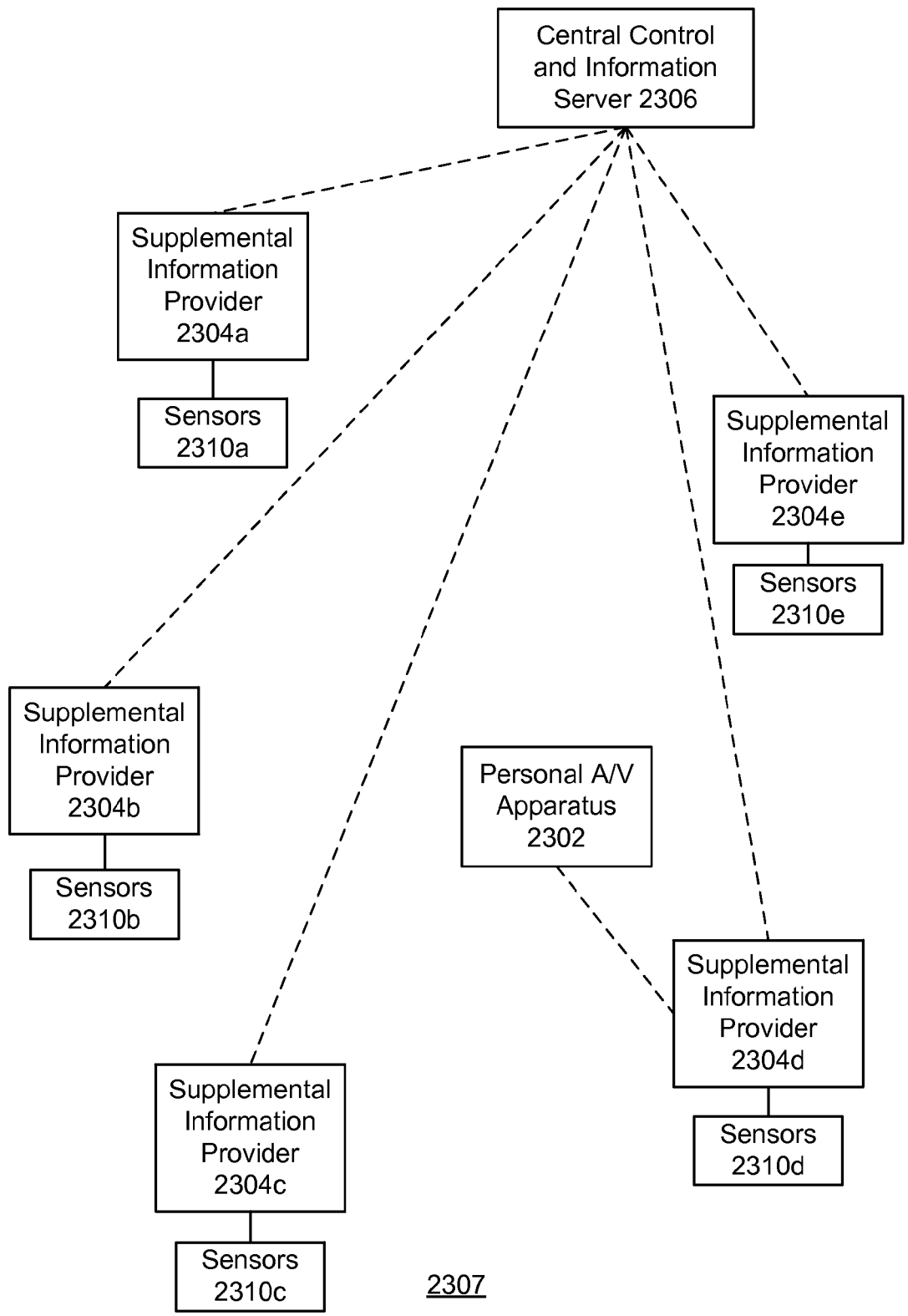
FIG. 5A depicts one embodiment of an AR system for providing virtual object information associated with a particular location or a particular place of interest.

FIG. 5A depicts one embodiment of an AR system 2307 for providing virtual object information associated with a particular location or a particular place of interest. A particular place of interest may include a department store, a furniture store, a car dealership, an amusement park, a museum, a zoo, or a person's work or residence. The particular place of interest may also include a classroom environment or other environment where information is being provided to a plurality of users simultaneously. The virtual object information may include 3-D maps of an environment and/or one or more virtual objects associated with an environment. To allow for the efficient storage and exchange of virtual objects, the one or more virtual objects may be transmitted using a predetermined and standardized file format.

AR system 2307 includes a personal A/V apparatus 2302 (e.g., an HMD such as mobile device 19 in FIG. 1) in communication with one of the Supplemental Information Providers 2304*a-e*. Supplemental Information Providers 2304*a-e* are in communication with a Central Control and Information Server 2306, which may include one or more computing devices. Each Supplemental Information Provider 2304 may be co-located with and in communication with one of one or more sensors 2310*a-e*. The sensors may include video sensors, depth image sensors, heat sensors, IR sensors, weight sensors, and motion sensors. In some embodiments, a Supplemental Information Provider may not be paired with any sensors.

Each of the Supplemental Information Providers may be placed at various locations throughout a particular place of interest. In one example, each ride at an amusement park may be associated with a Supplemental Information Provider. The Supplemental Information Providers may provide virtual object information or 3-D maps associated with a particular area within the particular place of interest. The sensors 2310 may acquire information regarding different subsections of the particular place of interest. For example, in the case of an amusement park, a Supplemental Information Provider 2304 and an accompanying set of one or more sensors 2310 may be placed at each ride or attraction in the amusement park. In the case of a museum, a Supplemental Information Provider 2304 may be located in each section or room of the museum, or in each major exhibit. The sensors 2310 may be used to determine the amount of people waiting in line for a ride (or exhibit) or how crowded the ride (or exhibit) is.

In one embodiment, AR system 2307 may provide to an end user of personal A/V apparatus 2302 directions on how to navigate through the place of interest. Additionally, Central Control and Information Server 2306, based on the information from the sensors 2310 can indicate which areas of the place of interest are less crowded. In the case of an amusement park, the system can tell the end user of personal A/V apparatus 2302 which ride has the shortest line. In the case of a ski mountain, the AR system 2307 can provide the end user of personal A/V apparatus 2302 with an indication of which lift line is the shortest or which trail is the less crowded. The personal A/V apparatus 2302 may move around the place of interest with the end user and may establish connections with the closest Supplemental Information Provider 2304 at any given time.

Figure 5B:
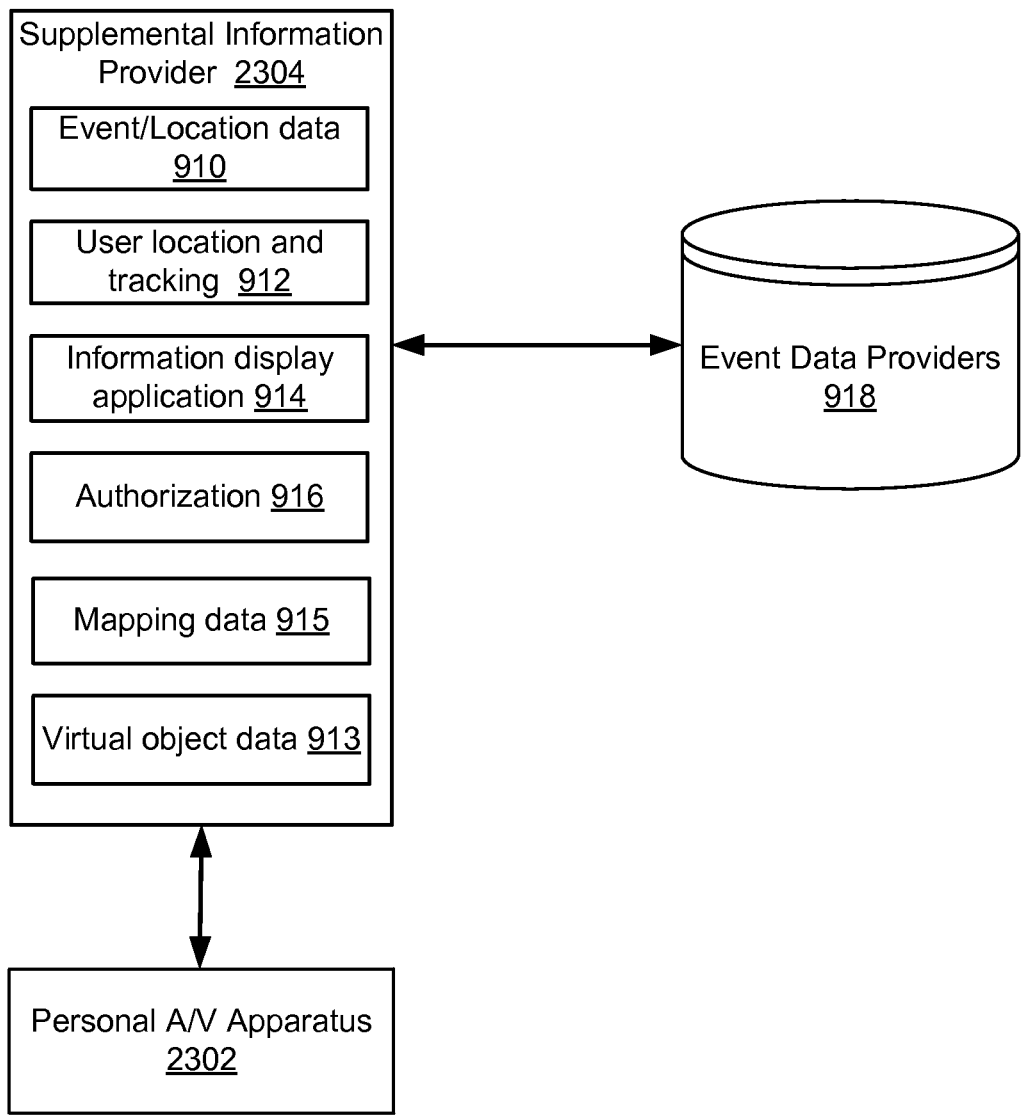
FIG. 5B shows one example of a system architecture for executing one or more processes and/or software on a Supplemental Information Provider.

FIG. 5B shows one example of a system architecture for executing one or more processes and/or software on a Supplemental Information Provider 2304, such as Supplemental Information Provider 2304*a* in FIG. 5A. Supplemental Information Provider 2304 may create and provide supplemental event or location data, or may provide services which transmit event or location data from third party event data providers 918 to an end user's personal A/V apparatus 2302. Multiple supplemental information providers and third party event data providers may be utilized with the present technology.

Supplemental Information Provider 2304 may include supplemental data for one or more events or locations for which the service is utilized. Event and/or location data can include supplemental event and location data 910 about one or more events known to occur within specific periods of time and/or about one or more locations that provide a customized experience. User location and tracking module 912 keeps track of various users which are utilizing the system. Users can be identified by unique user identifiers, location, and/or other identifying elements. An information display application 914 allows customization of both the type of display information to be provided to end users and the manner in which it is displayed. The information display application 914 can be utilized in conjunction with an information display application on the personal A/V apparatus 2302. In one embodiment, the display processing occurs at the Supplemental Information Provider 2304. In alternative embodiments, information is provided to personal A/V apparatus 2302 so that personal A/V apparatus 2302 determines which information should be displayed and where, within the display, the information should be located. Authorization application 916 may authenticate a particular personal A/V apparatus prior to transmitting supplemental information to the particular personal A/V apparatus.

Supplemental Information Provider 2304 also includes mapping data 915 and virtual object data 913. Mapping data 915 may include 3-D maps associated with one or more real-world environments. Virtual object data 913 may include one or more virtual objects associated with the one or more real-world environments for which mapping data is available. In some embodiments, the one or more virtual objects may be defined using a predetermined and standardized file format that supports state-based virtual objects.

Various types of information display applications can be utilized in accordance with the present technology. Different applications can be provided for different events and locations. Different providers may provide different applications for the same live event. Applications may be segregated based on the amount of information provided, the amount of interaction allowed or other feature. Applications can provide different types of experiences within the event or location, and different applications can compete for the ability to provide information to users during the same event or at the same location. Application processing can be split between the supplemental information provider 2304 and the personal A/V apparatus 902.

A system utilizing a personal A/V apparatus can be used to occupy a user while the user is waiting. For example, if the user is at an amusement park, many of the attractions may have long lines. While the user is waiting in line, the personal A/V apparatus can be used to provide the user with the opportunity to play games, review relevant information, or otherwise be entertained. In one embodiment, the content provided to the user while waiting in line is in context to the attraction the user is waiting for. In addition to amusement parks, the system can be used while waiting in other situations such as at stores, banks, tourist attractions, exhibits, museums, etc. In each case, while the user is waiting for something, the user can be provided with context sensitive information.

One embodiment includes a method for providing context sensitive information while the user is waiting, comprising connecting a personal A/V apparatus to a local server; verifying that the connection persists for a predefined amount of time; providing content that is context sensitive to the location the user is waiting in; and automatically detecting that the user is at the front of a line and concluding the presentation and response thereto.

Figure 6A:
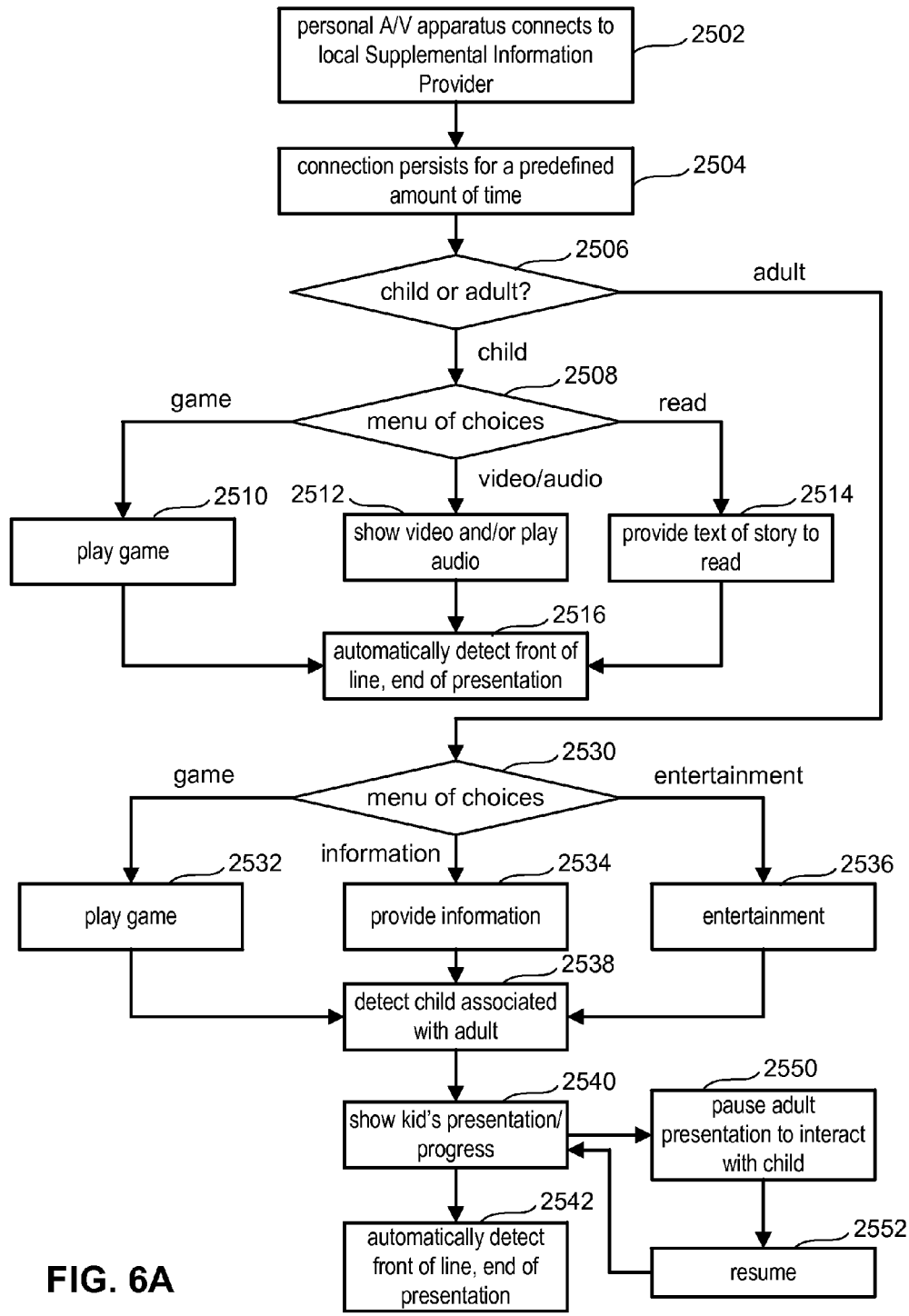
FIG. 6A is a flowchart describing one embodiment of method for providing context sensitive information to a user while that user is waiting.

FIG. 6A is a flowchart describing one embodiment of method for providing context sensitive information to a user while that user is waiting. The process of FIG. 6A can be implemented using the system of FIG. 5A. For example, Supplemental Information Providers can be situated at different attractions in an amusement park, different areas of a museum, different areas of an airport, etc. In step 2502, the personal A/V apparatus connects to the local Supplemental Information Provider. In one embodiment, the personal A/V apparatus will connect to the closest local Supplemental Information Provider. For example, if the user is at an amusement park, each attraction may have its own Supplemental Information Provider and the user's personal A/V apparatus will automatically connect to the Supplemental Information Provider for the current attraction that the user is waiting in line for. In step 2504, the Supplemental Information Provider will verify that the connection between the personal A/V apparatus and the Supplemental Information Provider persists for a predefined amount of time (e.g., 5 minutes). This is to verify that the user is in fact waiting in line rather than just walking by the Supplemental Information Provider. GPS or other location based information may also be used to confirm that the user is waiting in line within a particular waiting area associated with the attraction or exhibit.

In step 2506, the system will determine whether the user of the personal A/V apparatus is a child or an adult. In one embodiment, the personal A/V apparatus will indicate to a Supplemental Information Provider whether the user is a child or adult. In other embodiments, the Supplemental Information Provider will access the user profile for the user to determine whether the user is a child or an adult.

If the user is a child (step 2506), then the child is provided with a menu of choices in step 2508. In response to the menu of the choices, the child will choose one of the choices. In one embodiment, the choices include playing a game, watching a video (or listening to audio) or reading a story. If the child chooses to play a game, the child will be able to play a game at step 2510. If the child chooses to watch a video or listen to a story, the child would be provided with the presentation in step 2512. If the child chooses to read, then the text will be provided of a story so the child can read the story in step 2514.

In step 2516, the Supplemental Information Provider automatically detects that the user is at the front of the line and, in response thereto, ends the presentation (game, video, story, etc.). In one embodiment, the system can use a Bluetooth connection to identify that the personal A/V apparatus is at the front of the line. In another embodiment, the Supplemental Information Provider will use the attached sensors 2310 to detect (using video, depth images, still images, RFID tags, Bluetooth, etc.) that the user is at the front of the line. In another embodiment, the personal A/V apparatus can detect that it is at the front of the line based on its GPS sensor, video camera, depth camera, RFID tag, or other sensor.

If, in step 2506, it was determined that the user is an adult, then in step 2530 the user will be provided with a menu of choices (such as play a game, access information about the attraction the user is waiting for, of be presented with entertainment). In one embodiment, the game, information and entertainment are all context sensitive, in that they pertain to the attraction the user is waiting for. This is similar to the child's choices where the game, video and/or story are all context sensitive to the attraction the user is waiting for. For example, if the user is waiting to enter a haunted house, the game, video, story, information, or other entertainment can be about haunted houses in general or this specific haunted house. If the user chooses (in step 2530) to play a game, then the user would be provider with the opportunity to play a game in step 2532. If the user chooses to access more information, then the user will be provided with more information in step 2534. In one embodiment, step 2534 allows the user to access various pages of information about the attraction and/or provides a connection to the Internet or other network. If the user chooses to be entertained, in step 2536, the user will receive entertainment (e.g. video, audio).

After the content starts (step 2532, 2534, or 2536) the system can automatically detect that the adult is associated with a child. In one embodiment, this can be determined using the profiles for the users of the A/V apparatus. In another embodiment, the personal A/V apparatus with the child and adult can be pre-configured to broadcast that they are associated. Once detecting that the adult is associated with a child who is also receiving content (see steps 2510, 2512 and 2514), the child's presentation and/or progress through the presentation can be depicted within the display of the adult's A/V apparatus. That is, the adult looking through the see-through display of the personal A/V apparatus may see a projection of what the child is seeing. If the child is playing a game, a corner of the adult's display may show the game being played. If the child is watching a video, a corner of the adult's display may show the video being presented. If the child is reading a story, the text of the story will scroll through a corner of the adult's display. This way the adult can monitor what the child is doing in step 2540. At any point, if the adult believes that the child needs the adult's attention due to the content being displayed or other reason, the adult can pause their presentation to interact with the child in step 2550. When the adult is done interacting with the child, the adult's presentation can resume in step 2552 (and the process will loop back to step 2540). In step 2542, either the personal A/V apparatus or the Supplemental Information Provider, as described above, will automatically detect that the user is at the front of the line. In response to detecting that the user is at the front of the line, the system will end the presentation.

Figure 6B:
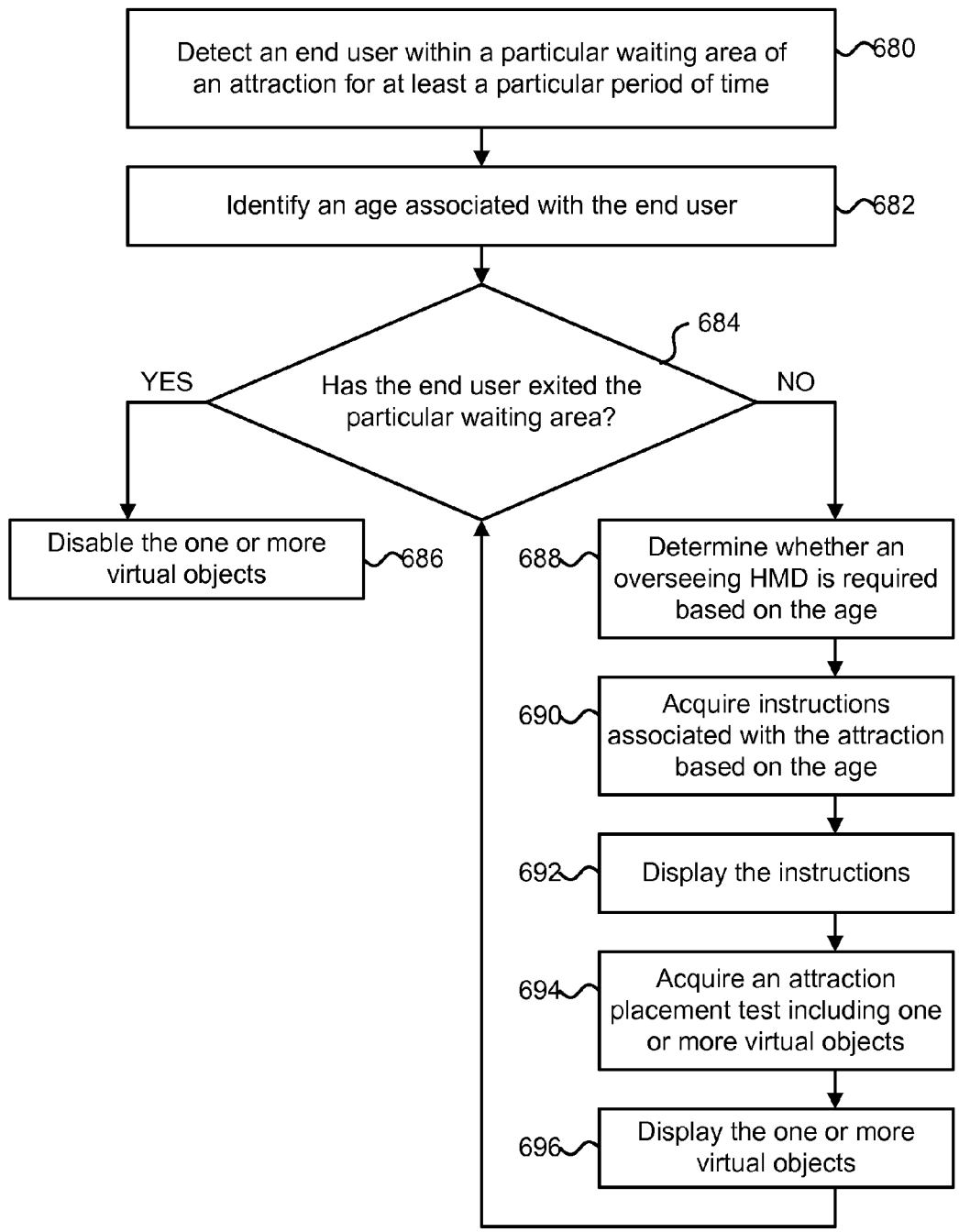
FIG. 6B is a flowchart describing one embodiment of a process for generating an augmented reality environment for an end user of an HMD waiting in line for a particular attraction.

FIG. 6B is a flowchart describing one embodiment of a process for generating an augmented reality environment for an end user of an HMD waiting in line for a particular attraction. In one embodiment, the process of FIG. 6B is performed by a mobile device, such as mobile device 19 in FIG. 1.

In step 680, an end user is detected within a particular waiting area of an attraction for at least a particular period of time. In one example, the end user is detected to have been located within a waiting line area for a particular museum exhibit for at least 5 minutes. The end user may be determined to have been located within the particular waiting area based on a GPS location associated with the end user.

In step 682, an age associated with the end user is identified. The age may be determined from a user profile associated with the end user.

In step 684, it is determined whether the end user has exited the particular waiting area. If the end user has exited the particular waiting area, then step 686 is performed. Otherwise, if the end user has not exited the particular waiting area, then step 688 is performed. In step 688, it is determined whether an overseeing HMD is required based on the age. In one example, an overseeing HMD may belong to a parent of a child using an HMD. A degree of overseeing may be set based on the age of the end user. For example, if the end user is greater than 12 years old, then any virtual objects displayed on the end user's HMD will be displayed subject to an override from the overseeing HMD. In some cases, the overseeing HMD may require approval for all virtual objects displayed on the end user's HMD. In some embodiments, the overseeing HMD may set an upper limit to the number of virtual objects presented to the end user or a maximum level of scariness associated with an attraction or exhibit.

In step 690, instructions associated with the attraction are acquired based on the age. In one example, adult instructions are provided if the end user is at least 18 years old and child instructions are provided if the end user is less than 18 years old. The adult instructions may include text instructions associated with the attraction. The child instructions may include pictures or animated images. In one embodiment, the instructions are associated with one or more virtual objects for providing the instructions (e.g., virtual text). In step 692, the instructions are generated and displayed to the end user. In one example, the instructions are displayed to the end user using a see-through HMD.

In step 694, an attraction placement test is acquired. The attraction placement test may include one or more virtual objects. In step 696, the one or more virtual objects are displayed to the end user. Each of the one or more virtual objects may be associated with a particular location within the real-world environment surrounding the end user. The one or more virtual objects may be generated using one or more constraints regarding the movement of the one or more virtual objects within an augmented reality environment presented to the end user. The attraction placement test may be used to determine the end user's level of skill or level of experience with the attraction. In one embodiment, the attraction may include an amusement park ride in which virtual objects may be targeted and shot at by the end user. The attraction placement test may include a sample set of virtual object targets to be targeted and shot at by the end user. Upon completion of the attraction placement test, the level of skill may be determined and provided to a supplemental information provider for future reference when the end user enters the attraction. After step 696 is performed, step 684 is performed.

In step 686, the one or more virtual objects are disabled. In one embodiment, the one or more virtual objects are disabled such that images of the one or more virtual objects are not displayed on an HMD associated with the end user (i.e., the end user of the HMD will not be able to view the one or more virtual objects). In some embodiments, upon being disabled, the one or more virtual objects may be deleted from the augmented reality environment.

In some embodiments, the end user may be provided with advertisements or other information based on their age. For example, virtual billboards may exist within the particular waiting area. These virtual billboards may display static images or videos. For example, an amusement park may have a virtual billboard with a video showing a preview for a movie associated with the theme park. In some embodiment, the end user's user profile may indicate languages spoken by the user which may be used to select and/or translate the advertisements or textual references associated with the attraction such that the information is presented to the end user in one of the languages spoken.

Figure 6C:
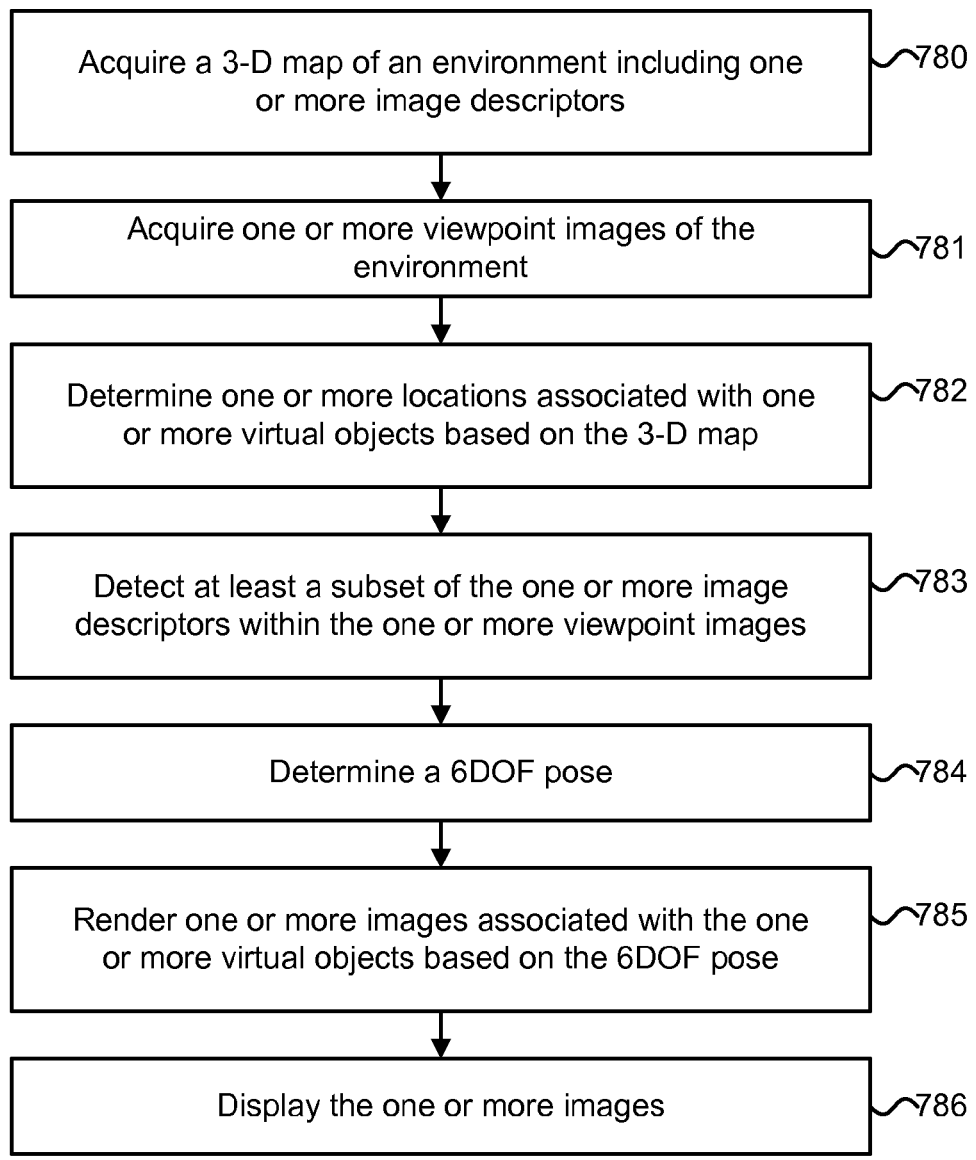
FIG. 6C is a flowchart describing one embodiment of a process for displaying one or more virtual objects.

FIG. 6C is a flowchart describing one embodiment of a process for displaying one or more virtual objects. The process described in FIG. 6C is one example of a process for implementing step 696 in FIG. 6B. In one embodiment, the process of FIG. 6C is performed by a mobile device, such as mobile device 19 in FIG. 1.

In step 780, a 3-D map of an environment is acquired. The 3-D map may be acquired from a supplemental information provider. The 3-D map may include one or more image descriptors. In step 781, one or more viewpoint images of the environment are acquired. The one or more viewpoint images may be associated with a particular pose of a mobile device, such as an HMD. In step 782, one or more locations associated with one or more virtual objects are determined based on the 3-D map acquired in step 780. In one embodiment, the one or more virtual objects are registered in relation to the 3-D map. In step 783, at least a subset of the one or more image descriptors are detected within the one or more viewpoint images. The one or more image descriptors may be detected by applying various image processing methods such as object recognition, feature detection, corner detection, blob detection, and edge detection methods to the one or more viewpoint images. The one or more image descriptors may be used as landmarks in determining a particular pose, position, and/or orientation in relation to the 3-D map. An image descriptor may include color and/or depth information associated with a particular object (e.g., a red apple) or a portion of a particular object within the particular environment (e.g., the top of a red apple).

In step 784, a six degree of freedom (6DOF) pose may be determined including information associated with the position and orientation of a mobile device within the environment. In step 785, one or more images associated with the one or more virtual objects are rendered based on the 6DOF pose determined in step 784. In step 786, the one or more images are displayed such that the one or more virtual objects are perceived to exist within the environment. More information regarding registering virtual objects and rendering corresponding images in an augmented reality environment can be found in U.S. patent application Ser. No. 13/152,220, "Distributed Asynchronous Localization and Mapping for Augmented Reality," incorporated herein by reference in its entirety.

A system with a personal A/V apparatus can be used to vary the experience of a ride at a theme park, exhibit at a museum, tourist attraction or other attraction. The system can be used to make sure the ride/exhibit is different for everyone or different for each trip the user makes on the same ride or exhibit. Additionally, the differences in experiences can be based on the seasons and/or demographics (age, gender, likes/dislikes, etc.).

One embodiment includes a method for providing a personalized experience, comprising connecting a personal A/V apparatus to a local server; verifying that the user of the personal A/V apparatus is in or on an attraction; accessing user profile for the user of the personal A/V apparatus; identifying an enhancement package that matches parameters from a user profile and has not already been experienced; implementing the enhancement package while the user is in/on the attraction; and automatically detecting that the user has completed the attraction and ending the enhancement package in response thereto.

FIG. 7A is a flowchart describing one embodiment or a process for providing a personalized experience to a user at an attraction (e.g., a ride in an amusement park, a tourist attraction, an exhibit at a museum, etc.). The process of FIG. 7A can be implemented using the system of FIG. 5A, where each of the Supplemental Information Providers are located at different rides, exhibits, attractions, etc. In step 2602, the personal A/V apparatus will connect to the local Supplemental Information Provider using WiFi, Bluetooth or other wireless technologies. In step 2604, the system will verify that the user is on or in the attraction. For example, sensors on the personal A/V apparatus (GPS sensors, video cameras, depth cameras, Bluetooth communication links, IR sensors, etc.) can determine if the user is on the ride. Additionally, sensors 2310 connected to a Supplemental Information Provider can detect that the user is on the ride using video cameras, depth cameras, RFID tags, Bluetooth, WiFi, etc. In step 2606, the Supplemental Information Provider 2304 will access the user profile for the user of the personal A/V apparatus as connected to the Supplemental Information Provider.

In one embodiment, for each attraction (e.g., each ride at an amusement park), the system will have a set of enhancement packages. Each enhancement package in the set of enhancement packages may have different sets of virtual graphics and sounds to be presented to the user via the personal A/V apparatus. The enhancement packages can be set up so that they are designed for different types of people. For example, some enhancement packages can be designed for children, some designed for middle-aged people, and some designed for older people. Some enhancement packages can be designed for males while other enhancement packages are designed for females. Some enhancement packages can be designed for people who live in one country and other enhancement packages can be designed for people who live in a different country. Enhancement packages can also be designed based on language, education, interest or theme, time of year, holiday, etc.

In step 2608 of FIG. 7A, the system will determine the subset of enhancement packages that meet the demographic parameters in the user's profile. For example, if the user is a 32 year old female from California with a college degree, the system will determine the appropriate set of enhancement packages for those parameters. In step 2610, the system may filter out any of the enhancement packages identified in step 2608 that the user has already experienced. In some cases, the user will get a different experience each time the user goes on the ride, visits the exhibit, etc. With the remaining enhancement packages after the filtering of step 2610, the system will randomly choose one of the remaining packages in step 2612. In this way, two people entering the same ride may get different experiences. In one embodiment, the system can choose one of the remaining enhancement packages by a means other than choosing randomly.

In step 2614, an indication of the chosen enhancement package is stored in the user's profile so that the next time the user visits this ride, exhibit or other attraction, the user will not be provided with the same enhancement package. In step 2616, the enhancement package is implemented while the user is in or on the attraction. In step 2618, the system will automatically detect that the attraction has completed and the enhancement package will be terminated. In one embodiment, sensors 2310 can determine that the attraction is completed. For example, the sensors can determine that the roller coaster ride is over.

FIG. 7B is a flowchart describing one embodiment of a process for implementing the package while the user is in or on the attraction. The process described in FIG. 7B is one example of a process for implementing step 2616 of FIG. 7A.

In step 2630, the personal A/V apparatus may determine its location and orientation. Additionally, the personal A/V apparatus may determine the gaze of the user. In step 2632, the location, orientation, and gaze are sent to a Supplemental Information Provider. In step 2634, the Supplemental Information Provider will determine the current enhancement to implement from the enhancement package chosen in step 2612 of FIG. 7A. For example, as the user is on a ride, different sounds can be provided to the user's personal A/V apparatus and/or different virtual graphics can be projected in the see-through display of the personal A/V apparatus. In one example, a user is on a haunted house ride. In different rooms of the haunted house, different images of ghosts and scary images will be provided to the user. Enhancements are sent to the personal A/V apparatus in step 2636 from the Supplemental Information Provider. In step 2638, the personal A/V apparatus will render the enhancement based on the personal A/V apparatus' location and orientation, as well as the gaze of the user. In step 2640, if the attraction is complete (see step 2618), then the enhancements will be terminated and an exit message will be provided to the user in step 2642. If the attraction is not complete, then the process will loop back to step 2630 and provide another set of one or more enhancements.

Figure 7C:
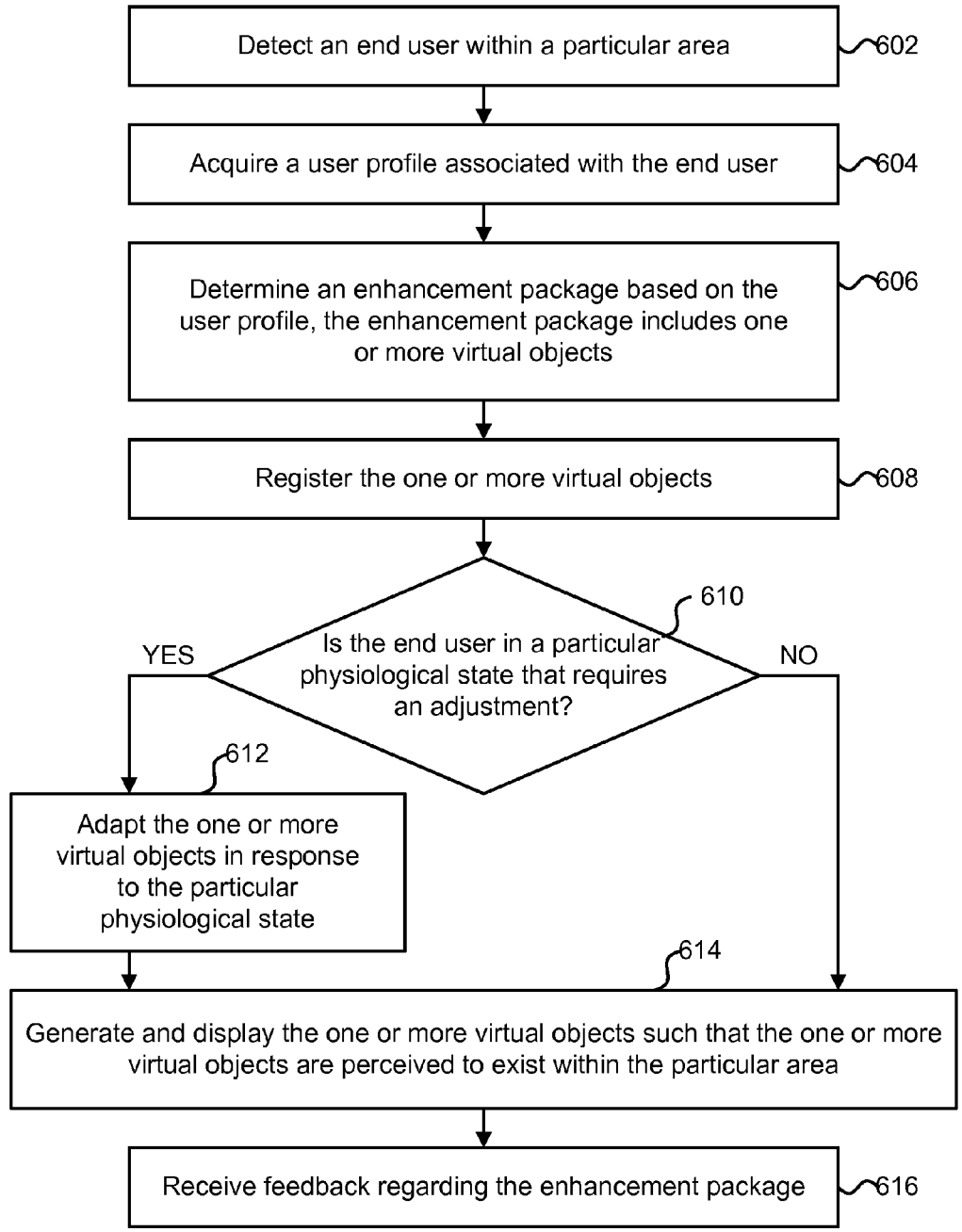
FIG. 7C is a flowchart describing one embodiment of a process for generating an augmented reality environment for an end user of an HMD while the end user is in or on a particular attraction.

FIG. 7C is a flowchart describing one embodiment of a process for generating an augmented reality environment for an end user of an HMD while the end user is in or on a particular attraction. In one embodiment, the process of FIG. 7C is performed by a mobile device, such as mobile device 19 in FIG. 1.

In step 602, an end user is detected within a particular area. The particular area may be associated with a particular attraction or exhibit. The end user may be determined to be within the particular area using location tracking such as GPS location tracking. In step 604, a user profile associated with the end user is acquired. The user profile may be linked to the end user via a unique personal identification or via a unique HMD identification associated with an HMD used by the end user.

In step 606, an enhancement package based on the user profile is determined. The enhancement package may include one or more virtual objects. In one embodiment, the one or more virtual objects are generated such that at least a first set of the one or more virtual objects has not been previously viewed by the end user. In some embodiments, the enhancement package includes one or more virtual objects that have received positive feedback from the end user while still providing an augmented reality environment that has not been previously experienced by the end user. One embodiment of a process for determining an enhancement package is described later in reference to FIG. 7E.

In step 608, the one or more virtual objects are registered. The one or more virtual objects may be registered in relation to a 3-D map provided to an HMD from a supplemental information provider. In some cases, the 3-D map of the real-world environment in which the HMD exists may be preloaded onto the HMD prior to the end user being located within the particular area. In step 610, it is determined whether the end user is in a particular physiological state that requires an adjustment or change to the one or more virtual objects. If the end user is in the particular physiological state, then step 612 is performed. Otherwise, if the end user is not the particular physiological state, then step 614 is performed.

In step 612, the one or more virtual objects are adapted in response to the particular physiological state. The particular physiological state may be based on a particular heart rate or a particular body temperature associated with the end user. In some cases, the particular physiological state may include the detection that the end user is in a scared state, a not scared enough state, or a bored state. The detection of the scared state or the bored state may be inferred via eye and/or pupil movements of the end user. The eye and/or pupil movements may be detected using an eye tracking system, such as eye tracking system 221 in FIG. 2B. One embodiment of a process for adapting the one or more virtual objects in response to the particular physiological state is described later in reference to FIG. 7D.

In step 614, the one or more virtual objects are generated and displayed such that the one or more virtual objects are perceived to exist within the real-world environment of the end user. In step 616, feedback regarding the enhancement package utilized is received and stored. In one embodiment, the feedback regarding the enhancement package is transmitted to a supplemental information provider upon completion of the attraction or exhibit by the end user. The feedback may include whether the end user liked or enjoyed the enhancement package or whether the end user thought the enhancement package to be challenging or easy. The feedback may also include the amount of time during which the enhancement package was utilized by the end user.

Figure 7D:
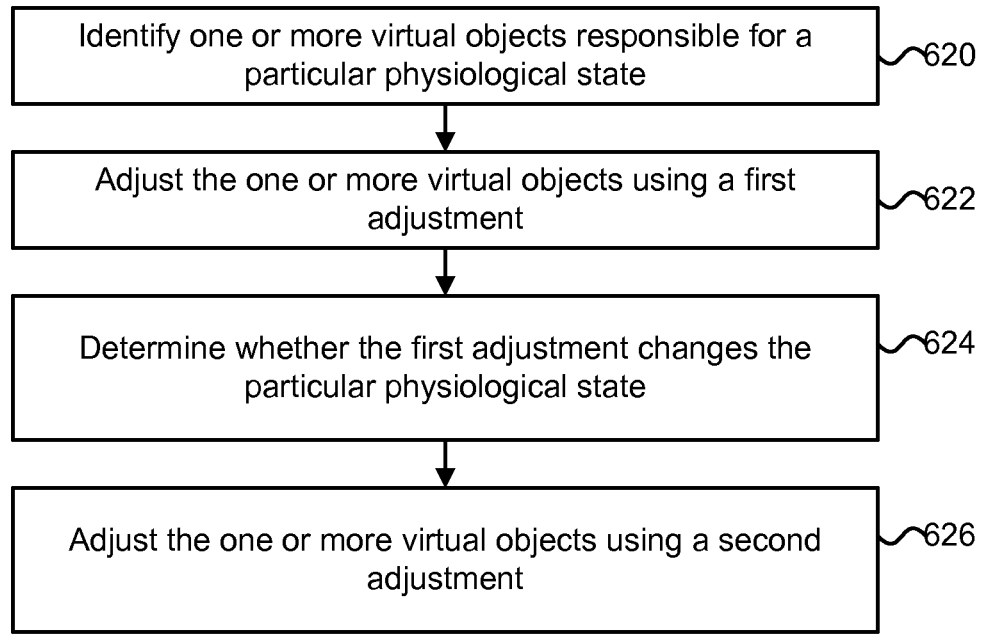
FIG. 7D is a flowchart describing one embodiment of a process for adapting one or more virtual objects in response to a particular physiological state.

FIG. 7D is a flowchart describing one embodiment of a process for adapting one or more virtual objects in response to a particular physiological state. The process described in FIG. 7D is one example of a process for implementing step 612 in FIG. 7C. In one embodiment, the process of FIG. 7C is performed by a mobile device, such as mobile device 19 in FIG. 1.

In step 620, one or more virtual objects responsible for a particular physiological state are identified. In one embodiment, upon detection of the particular physiological state (e.g., being scared), each virtual object being viewed by an end user within a predetermined period of time prior to the detection of the particular physiological state is identified. In some cases, gaze detection may be used to isolate a subset of the virtual objects being displayed to an end user of an HMD in order to identify the one or more virtual objects responsible for the particular physiological state. For example, gaze detection may be utilized to identify a first subset of virtual objects which were displayed to the end user within 20 seconds of the detection of the particular physiological state. Each virtual object of the first subset of virtual objects may have been viewed (in total) by the end user for at least half of the 20 second time period. For example, a first virtual object of the first subset of virtual objects may have been viewed by the end user continuously during the first three seconds of the 20 second time period and then during the last seven seconds of the 20 second time period.

In step 622, the one or more virtual objects identified in step 620 are adjusted using a first adjustment. The first adjustment may include slowing down (or speeding up) a movement associated with each of the one or more virtual objects. In some cases, the first adjustment may comprise making each of the one or more virtual objects transparent or semi-transparent. In one example, an HMD worn by a child may detect that the child is in a scared state. In response, the HMD may slow down each of the one or more virtual objects and/or increase the transparency of each of the one or more virtual objects. In another example, if the HMD determines that the end user is an adult and is bored, then the one or more virtual objects may be sped up and/or changed into scarier objects. In some embodiments, a lighting or sound property associated with the one or more virtual objects may be adjusted.

In step 624, it is determined whether the first adjustment caused a change in the particular physiological state. If the first adjustment was sufficient to cause a change in the particular physiological state (e.g., to remove the end user from the particular physiological state), then the first adjustment made to the one or more virtual objects may be deemed a final adjustment. Otherwise, if the first adjustment is not sufficient to cause a change in the particular physiological state, then the one or more virtual objects may be adjusted using a second adjustment, as depicted in step 626. In some cases, the second adjustment may include removing one or more of the one or more virtual objects from being viewed by the end user. In one embodiment, the second adjustment may include replacing (or substituting) one or more of the one or more virtual objects with different virtual objects. For example, if the one or more virtual objects comprise scary objects (e.g., a knife), then each of the one or more virtual objects may be replaced with less scary objects (e.g., a banana or feather).

Figure 7E:
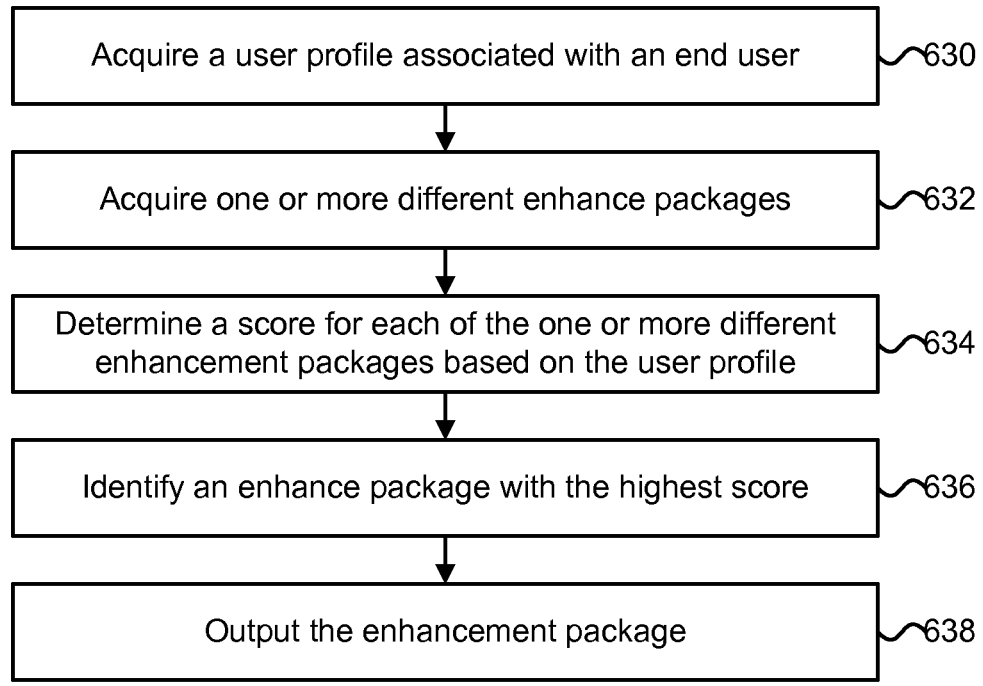
FIG. 7E is a flowchart describing one embodiment of a process for determining an enhancement package.

FIG. 7E is a flowchart describing one embodiment of a process for determining an enhancement package. The process described in FIG. 7E is one example of a process for implementing step 606 in FIG. 7C. In one embodiment, the process of FIG. 7E is performed by a server, such as supplemental information provider 2304 of FIG. 5B.

In step 630, a user profile associated with an end user is acquired. The user profile may include personal information associated with the end user such as their age and history of previously viewed or used enhancement packages. The user profile may also include a history of end user attraction accomplishments. For example, the end user may have received a particular score or reached a particular level of accomplishment associated with an attraction of exhibit. In some cases, the user profile may be pre-stored and updated on an HMD associated with the end user and transmitted to a supplemental information provider. In step 632, one or more different enhancement packages are acquired. In one embodiment, the different enhancement packages are associated with a particular attraction or exhibit. For example, each of the one or more different enhancement packages may correspond with different gaming environments associated with a particular amusement park ride. Each of the one or more different enhancement packages may be associated with a particular age group, level of experience, time of the day, day of the week, or season. In one example, a first enhancement package is associated with adults and a second enhancement package is associated with children.

In step 634, a score for each of the one or more different enhancement packages is determined based on the user profile. These score may be determined based on a weighted sum of various factors. In one embodiment, one or more enhancement packages of the one or more different enhancement packages that have not been previously viewed by the end user are given larger weighting and therefore will generate higher scores. In another embodiment, a large weighting will be given to one or more enhancement packages of the one or more different enhancement packages that comprise characteristics that have received positive reviews or feedback from the end user. In some embodiments, each of the one or more different enhancement packages are scored such that the highest score is given to an enhancement package that is the most different from each of the enhancement packages previously viewed or used by the end user. In step 636, the enhancement package with the highest score is identified. In step 638, the enhancement package is outputted.

In some embodiments, a plurality of end users riding the same attraction may each experience different augmented reality environments. In one example, a child riding a roller coaster may perceive a day time ride, while an adult riding the roller coaster may perceive a night time ride. In another example, an adult riding a train may perceive a scary ghost train, while a child riding the same train may perceive a less scary train ride.

In some embodiments, an end user riding a particular attraction may view one or more virtual objects associated with characters from a previous attraction. In one example, if the end user successfully shot a villain in a previous attraction, then the end user may perceive a ghost of the villain in a subsequent haunted house ride.

A personal A/V apparatus can also be used as a personal tour guide for tourists, or a docent for museum goers. For example, a system can determine the level of prior exposure to an attraction via the user's profile and then provide commentary, facts and suggestions to the user in regard to what the user is currently looking at. A user can set up an itinerary or task list of things the user wants to accomplish in a particular day and use the personal A/V apparatus to track whether the user had seen everything they intend to see. In a teaching situation, a teacher can bring the teacher's class to a museum or other attraction, and send a task list to each of the students. Each student will then have their own personal A/V apparatus to provide them with a list of tasks, commentary on each of the items they see and the ability to automatically track whether the student performs each task. For example, a task can be to view a particular exhibit in a museum, see a particular painting, etc. At the end of the day (or other time period) the teacher can be provided with a report indicating which students performed which tasks. Tasks can be acknowledged by RFID proximity, sensors, etc.

One embodiment includes a method for using a personal A/V apparatus as a personal tour guide, comprising: determining location and orientation of the personal A/V apparatus; determining the gaze of the user; accessing a user profile and obtaining a task list; sending a request for information about something being viewed; determining what is being viewed; accessing user profile to determine past experience with what is being viewed; accessing the user profile to access a task list; automatically determining whether the user is performing a task on the task list and, if so, updating the task list; filtering location data based on user's past experience and preparing additional information to be displayed to the user based on the filtered location data; displaying the information prepared for the user in the see-through display of the personal A/V apparatus and displaying the updated task list; and reporting the update of the task list to an authorized reviewer.

Figure 8A:
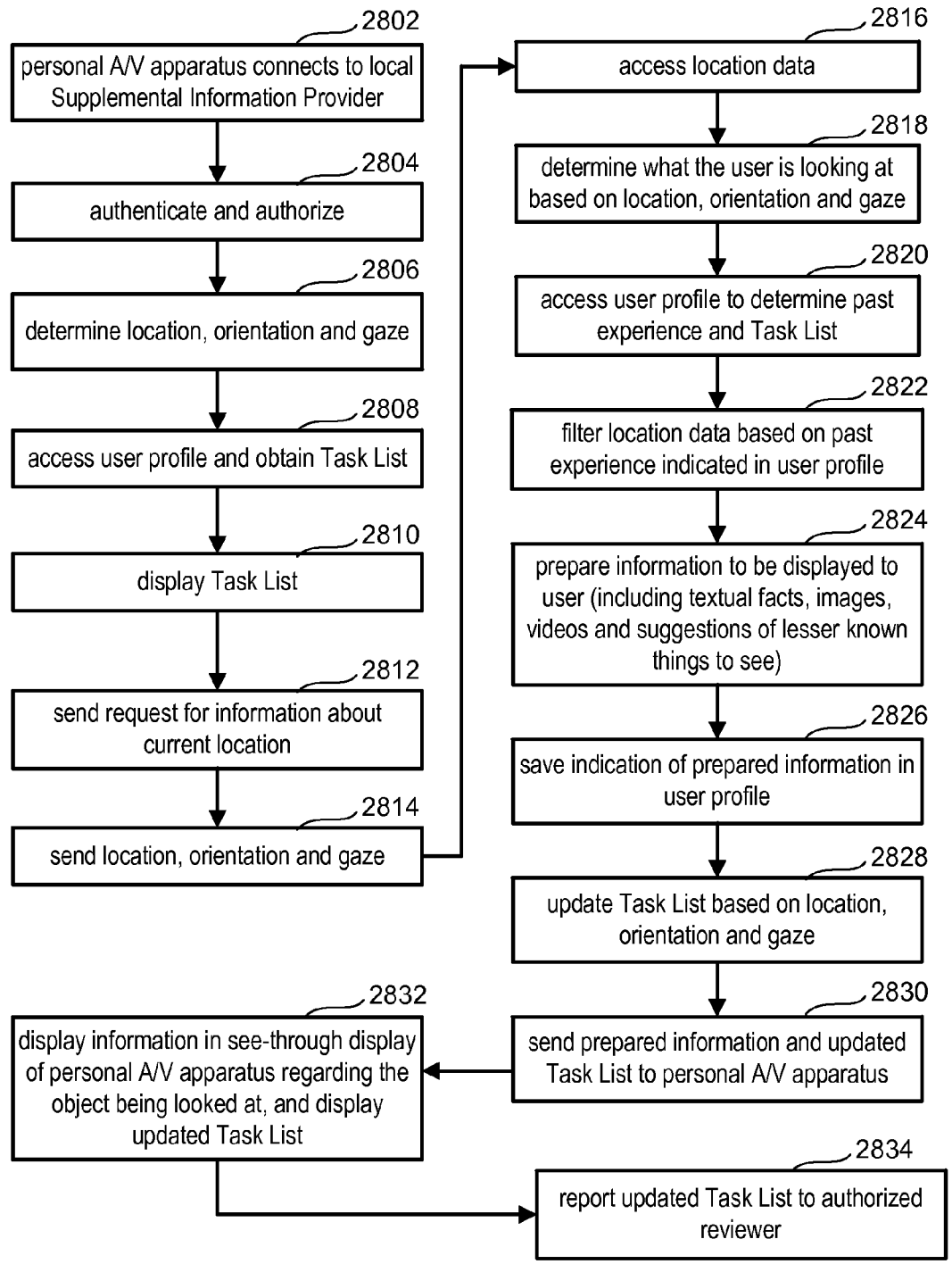
FIG. 8A is a flowchart describing one embodiment of a process for using an A/R apparatus as a personal tour guide.

FIG. 8A is a flowchart describing one embodiment of a process for using an A/R apparatus as a personal tour guide or docent. The system of FIG. 5A can be used to implement the process of FIG. 8A, with each of the Supplemental Information Providers being arranged at different exhibits, attractions, etc. in a particular location. In some cases, the steps of FIG. 8A on the left hand column may be performed at the personal A/V apparatus, and the steps on the right hand column of FIG. 8A may be performed at a central computer and information server (or a combination of the central computer and information server in combination with Supplemental Information Provider).

In step 2802 of FIG. 8A, a personal A/V apparatus will connect to the local Supplemental Information Provider. As the user moves throughout a location, the personal A/V apparatus may reconnect to different Supplemental Information Providers, all which are in communication with Central Control and Information Server. In step 2804, the user will authenticate and the system will make sure the user is authorized to access the service.

In step 2806, the personal A/V apparatus will determine its location and orientation. Additionally, the personal A/V apparatus will determine the gaze of the user. In step 2808, the personal A/V apparatus will access the user profile and obtain a task list. This can include contacting a Central Control and Information Server and obtaining a copy of the task list from the user's profile. In step 2810, the task list is displayed to the user via the see-through display of the personal A/V apparatus. In step 2812, the personal A/V apparatus will send a request to the Central Control and Information Server for information about what the user is looking at and/or where the user is currently located. In step 2814, the personal A/V apparatus will send the location, orientation and gaze to the Central Control and Information Server.

In step 2816, the system will access location data for the location that user is currently at (based on the location sent in step 2814). The location data will include facts, suggestions, images, videos of the location. Step 2818 includes determining what the user is looking at based on the location, orientation and gaze. For example, step 2818 may determine that the user is looking at a particular painting. In step 2820, the system will access the user profile to determine past experiences at the current location. The system will also access the task list which may be part of the user profile or separate from the user profile (but linked to the user profile). In step 2822, the system will filter all the location data accessed in step 2816, based on the past experiences of the user in this location as indicated by the user profile accessed in step 2820. In step 2824, information will be prepared for the user to be displayed in the personal A/V apparatus. The information being prepared will include textual facts, images, videos and suggestions of lesser known things to see in the area. This information will not include duplicate information already provided to the user or that the user already knows.

In step 2826, the system will save an indication of what information was prepared and sent to the user. This information will be stored in the user profile so the next time the user is at this location, new information can be provided. In step 2828, the task list can be updated based on the current location, orientation and gaze. For example, if one of the tasks was to view a painting and it is determined that the user is viewing that painting, then that task is marked as being accomplished. In another example, if the task is to view an exhibit in a particular room, and the user is in that room, that task is marked as being accomplished. Some embodiments will not include a task list.

In step 2830, the prepared information (see step 2824) and the update task lists are sent to the personal A/V apparatus. In step 2832, the personal A/V apparatus will display the information sent (and prepared in step 2824) in the see-through display of the personal A/V apparatus. That information will provide background about whatever object the user is looking at. Additionally, the personal A/V apparatus will display the updated task list.

In some embodiments, the task list is created by the user for the user's own benefit. In other embodiments, another party can create the task list. For example, a teacher may create a task list for a class of students on a field trip. In such an embodiment, the updates to the task list will be reported to an authorized reviewer (e.g. the teacher) in step 2834. In this manner, the teacher (or other authorized reviewer) can monitor whether the students are performing all the tasks they are supposed to be performing. In this manner, a teacher can bring a class to a museum or other place of interest, provide an itinerary of things to see and do, and monitor that each of the students do what they are supposed to be doing. The use of a task list could also be for a self-study program.

Figure 8B:
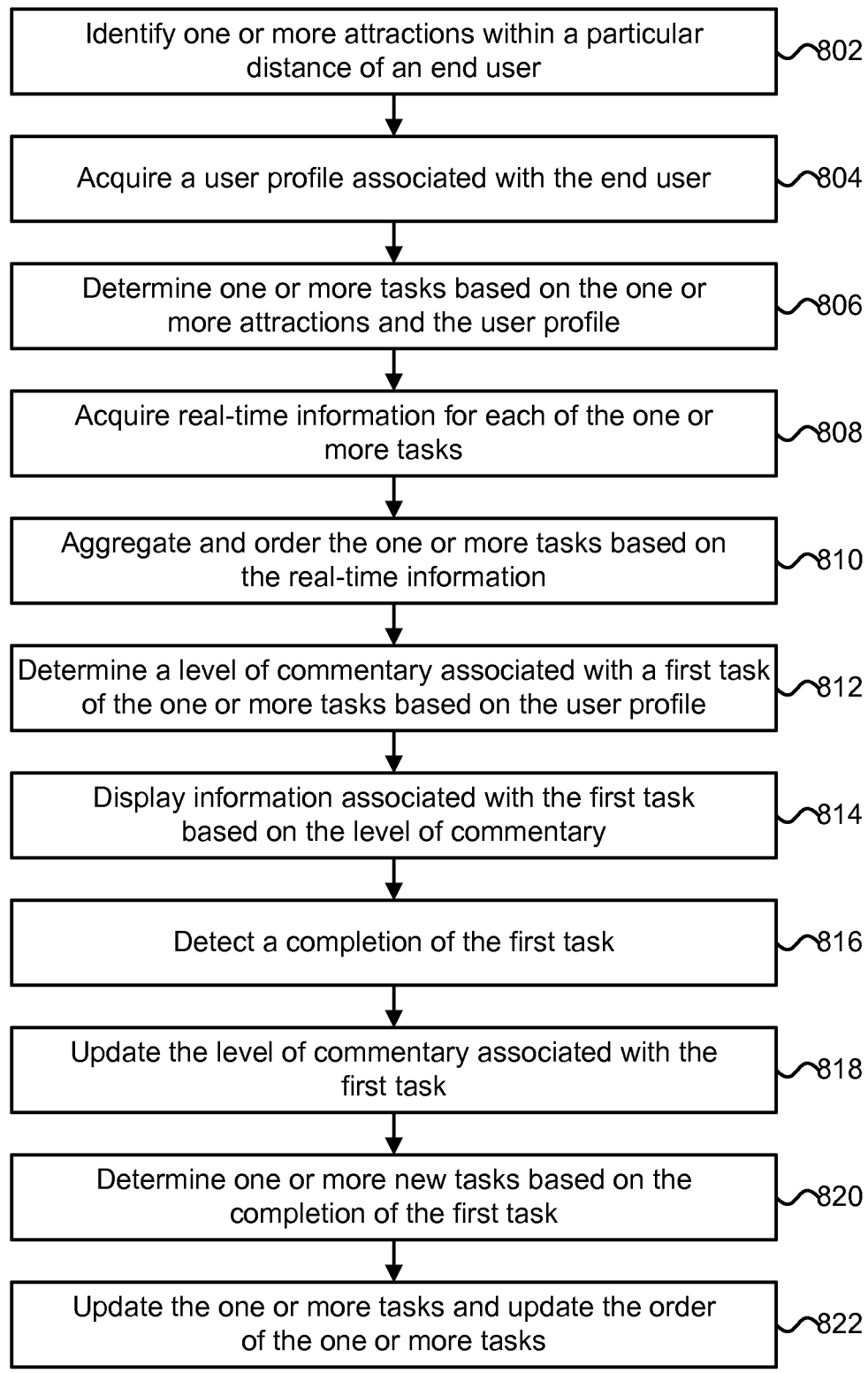
FIG. 8B is a flowchart describing one embodiment of a process for generating an augmented reality environment for an end user of an HMD that includes an automatically updated task list associated with a particular attraction.

FIG. 8B is a flowchart describing one embodiment of a process for generating an augmented reality environment for an end user of an HMD that includes an automatically updated task list associated with a particular attraction. In one embodiment, the process of FIG. 8B is performed by a mobile device, such as mobile device 19 in FIG. 1.

In step 802, one or more attractions are identified within a particular distance of an end user. For example, all attractions within 1000 feet of the end user may be identified. In one embodiment, a local server associated with a virtual tour guide may identify the one or more attractions available to the end user. The one or more attractions and associated information may only be provided to the end user if the end user had been authenticated or otherwise identified as having sufficient credentials to receive information associated with the one or more attractions (e.g., the end user has paid an attraction entry fee). In step 804, a user profile associated with the end user is acquired. The user profile may be linked to the end user via a unique personal identification or via a unique HMD identification associated with the HMD used by the end user. The user profile may include personal information associated with the end user such as the age of the end user and varying levels of experience associated with the one or more attractions.

In step 806, one or more tasks based on the one or more attractions and the user profile are determined. The one or more tasks may be grouped based on each of the one or more attractions. For example, a first set of tasks may be associated with a first attraction and a second set of tasks may be associated with a second attraction different from the first attraction. Each of the one or more tasks may comprise an activity to be performed by the end user. In one example, the one or more tasks may be associated with a particular exhibit at a museum including five different paintings. The one or more tasks may comprise activities associated with each of the five different paintings (e.g., looking at each of the five different paintings for more than a particular time duration).

In step 808, real-time information for each of the one or more tasks is acquired. In one embodiment, the real-time information may include delay information associated with a particular attraction (e.g., the estimated waiting time and/or the estimate time to experience the particular attraction). The real-time information may also include a list of participants associated with the particular attraction. The real-time information may also include the current queue length for the particular attraction.

In step 810, the one or more tasks determined in step 806 are aggregated and ordered based on the real-time information. In one embodiment, the ordering of the one or more tasks may be based on a distance between the end user and each of the one or more attractions. In another embodiment, the ordering of the one or more tasks may be based on an estimated minimum time for completing each of the one or more tasks. In some embodiments, the ordering of the one or more tasks is based on a degree of difficulty for completing each of the one or more tasks. In some cases, the one or more tasks may also be ordered based on a particular user profile setting (e.g., a "choose your own adventure" setting in the user profile). In step 812, a level of commentary associated with a first task of the one or more tasks is determined based on the user profile. In one embodiment, an end user's history with a particular attraction associated with the first task is used to set the level of commentary. For example, if the first task is associated with a dinosaur exhibit, the end user's previous experience with the dinosaur exhibit may be taken into account in order to determine the level of detail or the level of commentary to assign to the end user. In some embodiments, the first task may be the highest priority or highest ranking task of the one or more tasks.

In step 814, information associated with the first task is displayed to the end user based on the level of commentary. In step 816, a completion of the first task is detected. In one embodiment, the completion is detected via gaze tracking. In one example, the completion may be detected when the end user looks at a particular object for a particular period of time. In another example, the completion may be detected when the end user verbally answers a particular question presented to the end user associated with the first task. The completion of the first task may also lead to the acquisition of a digital merit badge or other award. One embodiment of a process for detecting the completion of the first task is described later in reference to FIG. 8C.

In step 818, the level of commentary associated with the first task is updated. Upon completion of the first task, the level of commentary may be incremented to a higher level of commentary (e.g., a more detailed or challenging level of commentary). In step 820, one or more new tasks based on the completion of the first task are determined. In one embodiment, upon completion of the first task, the one or more new tasks may comprise awarded new tasks. The awarded new tasks may be associated with attractions or exhibits that are new to the end user. In some cases, upon completion of the first task, a real-world incentive may be provided such as the placement of the end user into a shorter line at an amusement park or museum. In step 822, the one or more tasks are updated and the order of the one or more tasks is updated. In one embodiment, a new first task is presented to the end user as the next task to be completed. The new first task may be presented to the end user as a green arrow pointing in the direction of the new first task on the end user's HMD.

In some embodiments, an end user may visit a dinosaur museum and view skeletons of various dinosaurs. Upon completion of reading text associated with a particular dinosaur, the end user's HMD may allow the end user to perceive flesh on the particular dinosaur skeleton and hear sounds associated with the particular dinosaur.

In some embodiments, a virtual leaderboard may be presented to the end user indicating task completion status for one or more groups of people. In one example, students in a class field team may be split up into separate groups and the overall task completion status for each of the separate groups may be presented to the end user (e.g., a teacher or student of the class) using their HMD.

Figure 8C:
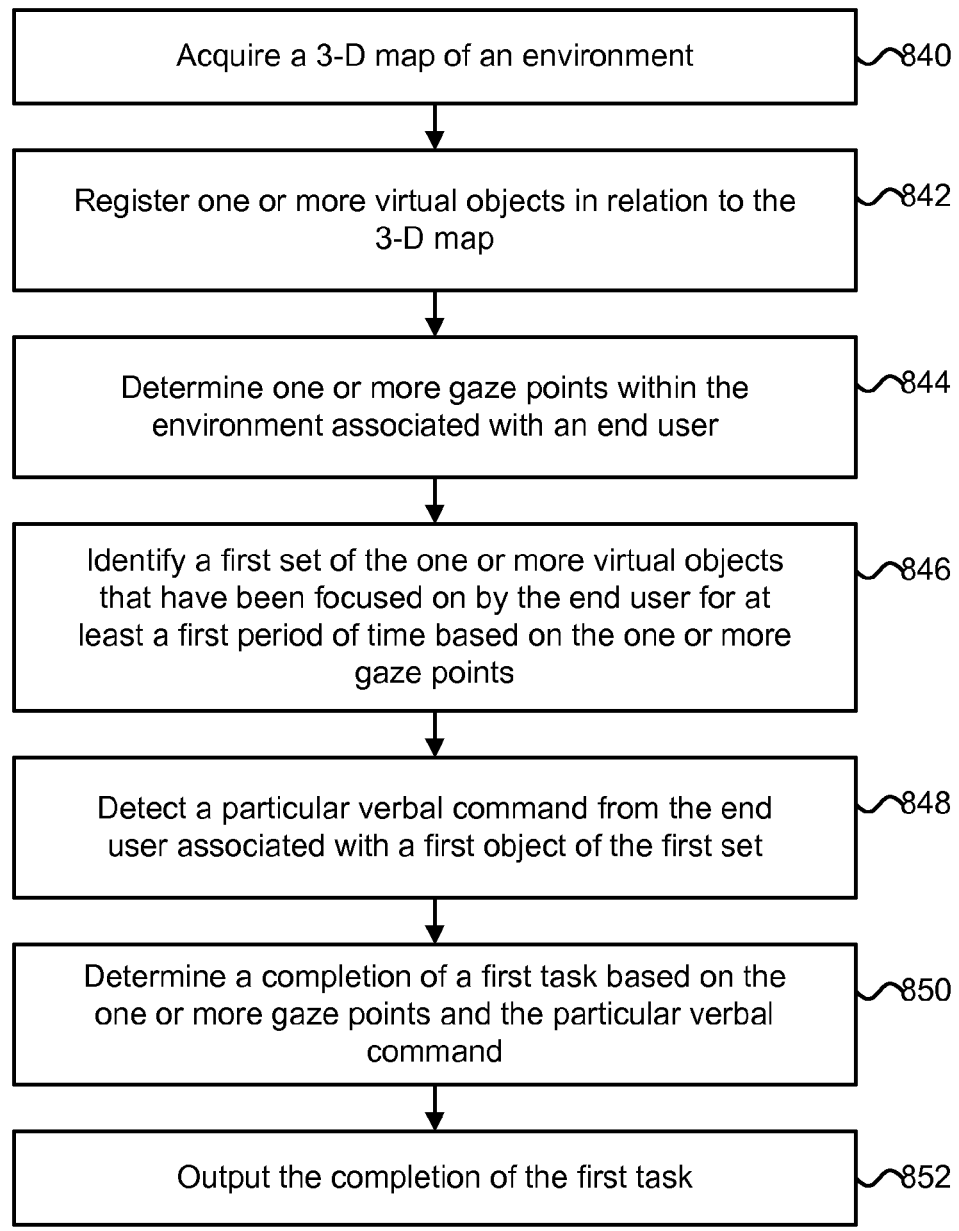
FIG. 8C is a flowchart describing one embodiment of a process for detecting the completion of a task.

FIG. 8C is a flowchart describing one embodiment of a process for detecting the completion of a task. The process described in FIG. 8C is one example of a process for implementing step 816 in FIG. 8B. In one embodiment, the process of FIG. 8C is performed by a mobile device, such as mobile device 19 in FIG. 1.

In step 840, a 3-D map of an environment is acquired. The 3-D map may be acquired from a supplemental information provider prior to entry of a particular attraction by the end user of an HMD. The 3-D map may include one or more image descriptors and may provide landmark information associated with one or more real-world objects. In step 842, one or more virtual objects may be registered in relation to the 3-D map. The one or more virtual objects may correspond with virtual items associated with the particular attraction. In step 844, one or more gaze points are determined within the environment associated with the end user. The one or more gaze points may be determined using gaze tracking techniques. The one or more gaze points may correspond with one or more objects (either real-world objects or virtual objects) within the augmented reality environment at which the end user has been focusing. In one embodiment, an HMD worn by the end user may correspond with HMD 2 of FIGS. 2C-2D.

In step 846, a first set of the one or more virtual objects that have been focused on by the end user for at least a first period of time is identified. The first set may be identified based on the one or more gaze points determined in step 844. In one example, the first set comprises one or more real-world objects that have been focused on by the end user for at least 20 seconds. In step 848, a particular verbal command from the end user associated with a first object of the first set is detected. In one embodiment, the particular verbal command may be detected using voice recognition or other audio signal processing techniques that match the particular verbal command with a predefined audio pattern.

In step 850, a completion of a first task is determined. The completion may be determined based on the one or more gaze points determined in step 844 and the particular verbal command detected in step 848. In one embodiment, the completion of the first task is determined based solely on the one or more gaze points. In step 852, the completion of the first task is outputted. In some cases, the completion of the first task is outputted to a supplemental information provider associated with an attraction or exhibit.

One embodiment of the disclosed technology includes detecting a user within a particular area, acquiring a user profile associated with the user, and determining an enhancement package based on the user profile. The enhancement package includes one or more virtual objects that have not been previously viewed or experienced by the user. The method further includes determining that the user is in a particular physiological state, adapting the one or more virtual objects based on the particular physiological state, and displaying on the mobile device one or more images associated with the one or more virtual objects such that the one or more virtual objects are perceived to exist within the particular area.

One embodiment of the disclosed technology includes connecting a mobile device to a supplemental information provider, verifying that a user of the mobile device is within an attraction area associated with an attraction, accessing a user profile associated with the user, acquiring an enhancement package that has not been previously experienced by the user from the supplemental information provider based on the user profile, generating one or more virtual objects based on the enhancement package while the user is within the attraction area, and displaying on the mobile device one or more images associated with the one or more virtual objects such that the one or more virtual objects are perceived to exist within the attraction area while the user is within the attraction area.

One embodiment of the disclosed technology includes a memory, one or more processors, and a see-through display. The memory stores a user profile associated with a user of the electronic device. The one or more processors detect a user within a particular area, acquire the user profile associated with the user, and determine an enhancement package based on the user profile. The enhancement package includes one or more virtual objects that have not been previously experienced by the user. The one or more processors determine that the user is in a particular physiological state, adapt the one or more virtual objects based on the particular physiological state, and generate one or more images associated with the one or more virtual objects. The see-through display displays the one or more images such that the one or more virtual objects are perceived to exist within the particular area.

One embodiment of the disclosed technology includes identifying one or more attractions within a particular distance of a user, acquiring a user profile associated with the user, determining one or more tasks based on the one or more attractions and the user profile, acquiring real-time information for at least a subset of the one or more tasks, and ordering the one or more tasks based on the real-time information. The one or more tasks include a first task. The method further includes determining a level of commentary associated with the first task based on the user profile, displaying on the mobile device information associated with the first task based on the level of commentary associated with the first task, detecting a completion of the first task, and updating the level of commentary associated with the first task in response to the completion of the first task.

One embodiment of the disclosed technology includes determining a location associated with the mobile device, determining a gaze associated with a user of the mobile device, accessing a user profile for the user, and generating a task list for the user based on the user profile and the location. The task list includes one or more tasks. The method further includes automatically determining whether a first task of the one or more tasks has been completed based at least on the gaze and updating the task list in response to the determining that the first task has been completed. The updating the task list includes acquiring additional information associated with the location. The method further includes displaying on the mobile device the updated task list.

One embodiment of the disclosed technology includes one or more processors and a see-through display. The one or more processors identify one or more attractions within a particular distance of a user of the electronic device, acquire a user profile associated with the user, and generate one or more tasks based on the one or more attractions and the user profile. The one or more tasks include a first task. The one or more processors acquire real-time information for the first task, order the one or more tasks based on the real-time information, determine a level of commentary associated with the first task based on the user profile, detect a completion of the first task, and update the level of commentary associated with the first task in response to the completion of the first task. The see-through display displays information associated with the first task based on the updated level of commentary.

One embodiment of the disclosed technology includes detecting a user of the mobile device within a particular waiting area of an attraction, identifying an age associated with the user, and acquiring virtual object information associated with the attraction based on the age of the user. The virtual object information includes one or more virtual objects. The method further includes generating and displaying on the mobile device one or more images associated with the one or more virtual objects such that the one or more virtual objects are perceived to exist within the particular waiting area, detecting the user exiting the particular waiting area, and disabling the one or more virtual objects in response to the detecting the user exiting the particular waiting area.

One embodiment of the disclosed technology includes identifying a supplemental information provider, establishing a connection with the supplemental information provider, determining that the mobile device is associated with a user waiting in line for a particular attraction, and acquiring one or more virtual objects from the supplemental information provider in response to the determining that the mobile device is associated with a user waiting in line for a particular attraction. The one or more virtual objects are associated with the particular attraction. The method further includes displaying on the mobile device one or more images associated with the one or more virtual objects such that the one or more virtual objects are perceived to exist within a real-world environment by the user.

One embodiment of the disclosed technology includes an augmented reality system comprising one or more processors and a see-through display. The one or more processors detect a user of the electronic device within a particular waiting area of an attraction, identify an age associated with the user, and acquire virtual object information associated with the attraction based on the age of the user. The virtual object information includes one or more virtual objects associated with the attraction. The one or more processors acquire an attraction placement test including one or more other virtual objects, and generate one or more images associated with the one or more virtual objects and the one or more other virtual objects while the user is within the particular waiting area. The see-through display displays one or more images such that the one or more virtual objects and the one or more other virtual objects are perceived to exist within the particular waiting area by the user.

Figure 9:
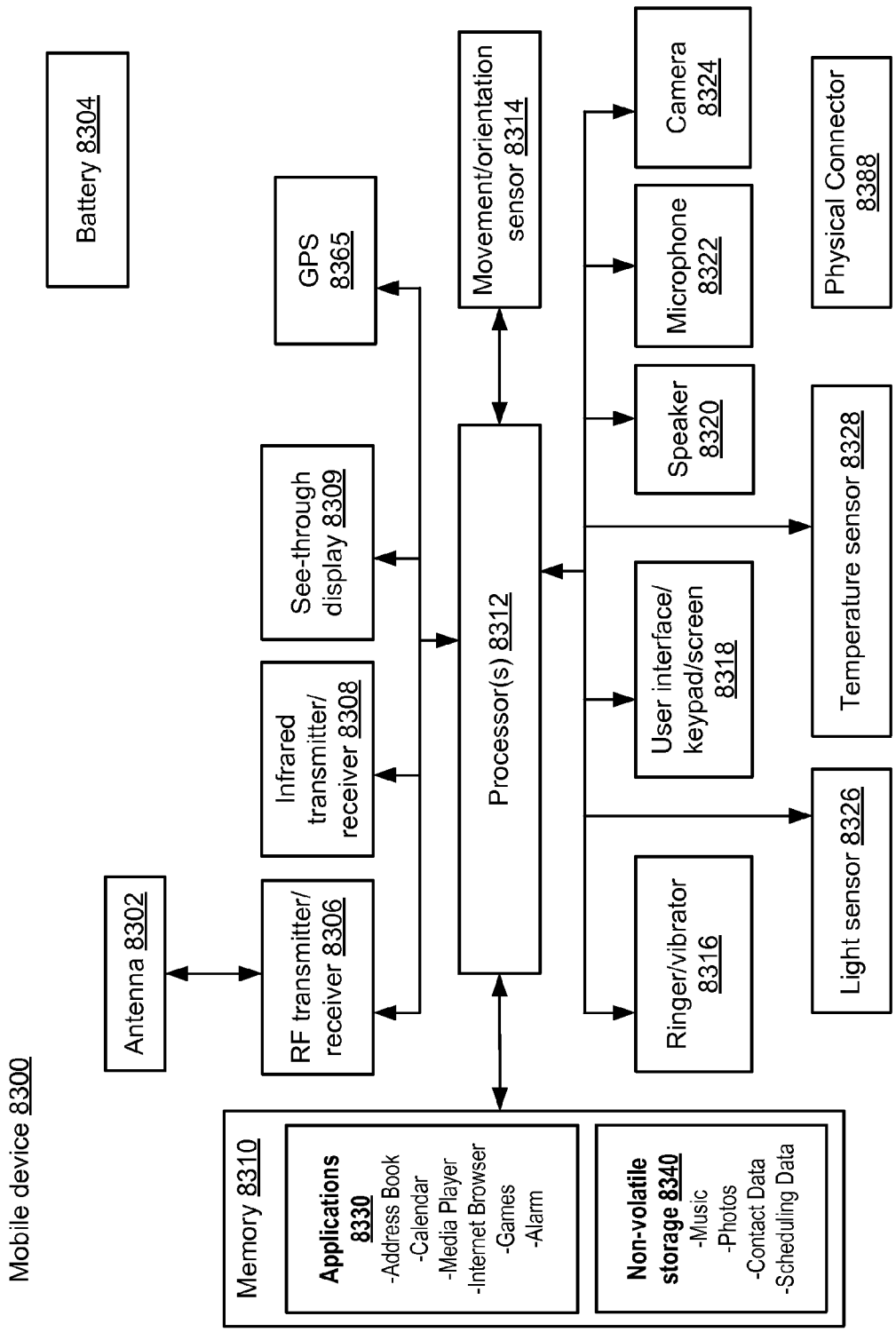
FIG. 9 is a block diagram of one embodiment of a mobile device.
Figure 10:
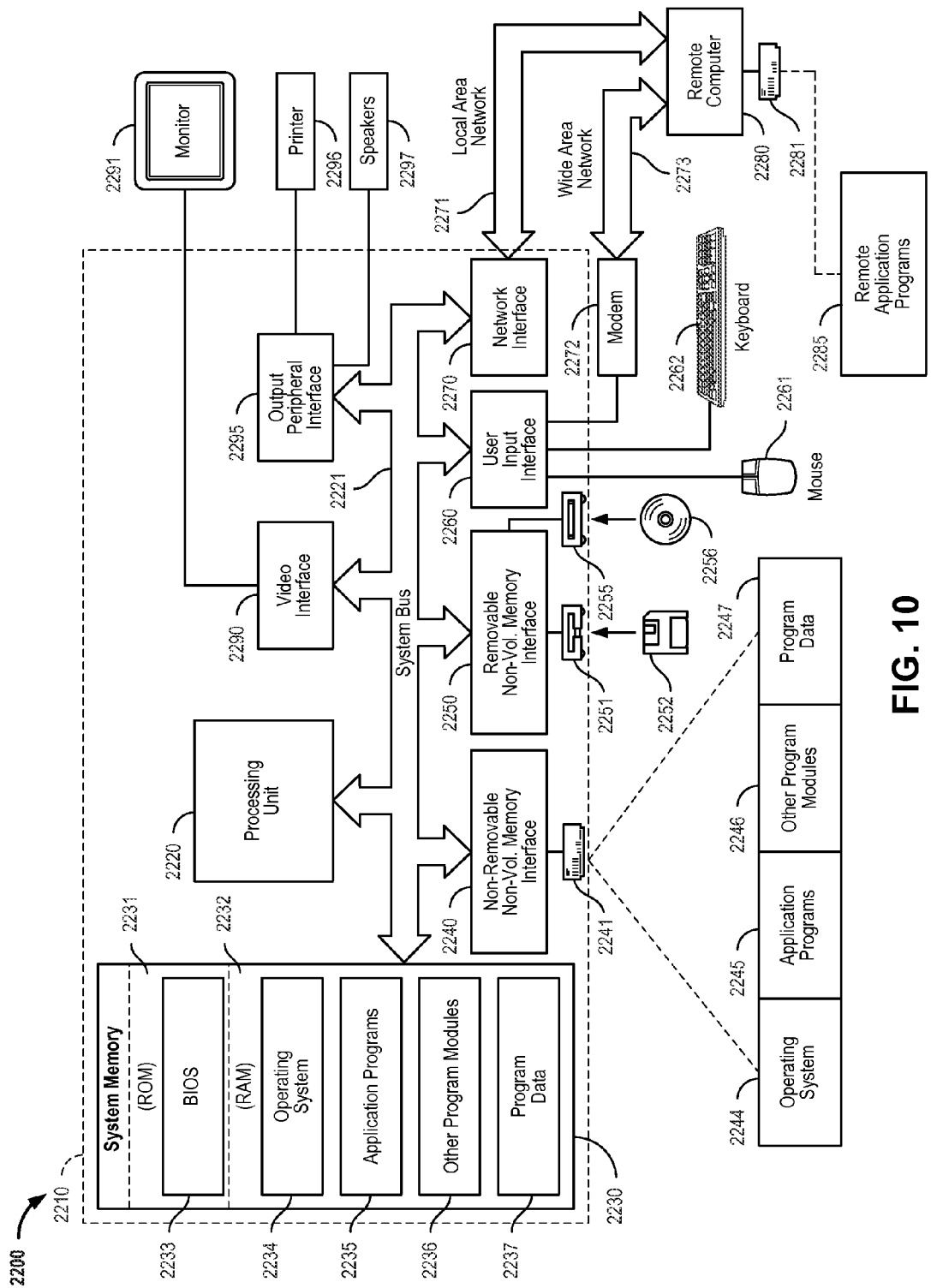
FIG. 10 is a block diagram of an embodiment of a computing system environment.

The disclosed technology may be used with various computing systems. FIGS. 9-10 provide examples of various computing systems that can be used to implement embodiments of the disclosed technology.

FIG. 9 is a block diagram of one embodiment of a mobile device 8300, such as mobile device 19 in FIG. 1. Mobile devices may include laptop computers, pocket computers, mobile phones, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 are in communication with a see-through display 8309. The see-through display 8309 may display one or more virtual objects associated with a real-world environment. The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

FIG. 10 is a block diagram of an embodiment of a computing system environment 2200, such as computing system 10 in FIG. 3B. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. By way of example, and not limitation, FIG. 10 illustrates operating system 2234, application programs 2235, other program modules 2236, and program data 2237.

The computer 2210 may also include other removable/non-removable, volatile/nonvolatile computer storage media. By way of example only, FIG. 10 illustrates a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media discussed above and illustrated in FIG. 10, provide storage of computer readable instructions, data structures, program modules and other data for the computer 2210. In FIG. 10, for example, hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210, although only a memory storage device 2281 has been illustrated in FIG. 10. The logical connections depicted in FIG. 10 include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. By way of example, and not limitation, FIG. 10 illustrates remote application programs 2285 as residing on memory device 2281. It will be appreciated that the network connections shown are exemplary and other means of establishing a communications link between the computers may be used.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating an augmented reality environment using a mobile device, comprising:
   detecting a user of the mobile device within a particular area of an attraction;
   identifying an age associated with the user;
   acquiring at the mobile device a set of virtual objects associated with the attraction based on the age of the user;
   detecting that a heart rate of the user is above a particular threshold while the user is within the particular area;
   identifying one or more virtual objects of the set of virtual objects that were viewed by the user within a particular period of time prior to detecting that the heart rate of the user is above the particular threshold;
   adjusting an object speed associated with each of the one or more virtual objects;
   detecting that the heart rate of the user has not changed subsequent to adjusting the object speed associated with each of the one or more virtual objects;
   replacing the one or more virtual objects with one or more other virtual objects different from the one or more virtual objects in response to detecting that the heart rate of the user has not changed subsequent to adjusting the object speed associated with each of the one or more virtual objects; and
   generating and displaying on the mobile device one or more images associated with the one or more other virtual objects in response to replacing the one or more virtual objects with the one or more other virtual objects, the one or more images are displayed such that the one or more other virtual objects are perceived to exist within the particular area.

2. The method of claim 1, further comprising:
   detecting that the user has exited the particular area; and
   disabling the one or more other virtual objects from being displayed on the mobile device in response to detecting that the user has exited the particular area.

3. The method of claim 2, further comprising:
   acquiring an attraction placement test, the attraction placement test includes one or more placement test virtual objects; and
   generating and displaying the one or more other placement test virtual objects while the user is within the particular area.

4. The method of claim 2, wherein:
   the disabling of the one or more other virtual objects prevents the one or more other virtual objects from being displayed on the mobile device.

5. The method of claim 1, further comprising:
   detecting that the user is at the front of a line associated with the attraction; and
   disabling the one or more other virtual objects from being displayed on the mobile device in response to detecting that the user is at the front of the line.

6. The method of claim 1, wherein:
   the attraction comprises a ride at an amusement park.

7. The method of claim 1, wherein:
   the mobile device comprises a head-mounted display device.

8. One or more storage devices containing processor readable code for programming one or more processors to perform a method for generating an augmented reality environment using a mobile device comprising the steps of:
   detecting that the mobile device is within a particular area of an attraction;
   acquiring at the mobile device a set of virtual objects based on an age of the user;
   detecting that a heart rate of the user is above a particular threshold while the user is within the particular area;
   identifying one or more virtual objects of the set of virtual objects that were viewed by the user within a particular period of time prior to detecting that the heart rate of the user is above the particular threshold;
   adjusting an object speed associated with each of the one or more virtual objects, the adjusting an object speed comprises slowing down a movement of each of the one or more virtual objects;
   detecting that the heart rate of the user has not changed subsequent to adjusting the object speed;
   replacing the one or more virtual objects with one or more other virtual objects different from the one or more virtual objects in response to detecting that the heart rate of the user has not changed subsequent to adjusting the object speed; and
   generating and displaying on the mobile device one or more images associated with the one or more other virtual objects, the one or more images are displayed such that the one or more other virtual objects are perceived to exist within the particular area.

9. The one or more storage devices of claim 8, further comprising:
   automatically detecting that the user is at the front of a line associated with the attraction; and
   disabling the one or more other virtual objects in response to detecting that the user is at the front of the line.

10. The one or more storage devices of claim 9, wherein:
    the disabling the one or more virtual other objects prevents the one or more other virtual objects from being displayed on the mobile device.

11. The one or more storage devices of claim 9, wherein:
    the attraction comprises a ride at an amusement park.

12. The one or more storage devices of claim 8, wherein:
    the detecting that the mobile device is within the particular area includes verifying that a connection between the mobile device and a supplemental information provider has persisted for at least a predefined amount of time.

13. The one or more storage devices of claim 8, wherein:
    the mobile device comprises a head-mounted display device.

14. An electronic device for generating an augmented reality environment, comprising:
    one or more processors configured to detect a user of the electronic device within a particular area of an attraction and acquire a set of virtual objects associated with the attraction based on an age of the user, the one or more processors configured to detect that a heart rate of the user is above a particular threshold while the user is within the particular area and identify one or more virtual objects of the set of virtual objects that were viewed by the user within a particular period of time prior to detecting that the heart rate of the user is above the particular threshold, the one or more processors configured to adjust an object speed associated with each of the one or more virtual objects and detect that the heart rate of the user has not changed subsequent to adjusting the object speed, the one or more processors configured to replace the one or more virtual objects with one or more other virtual objects different from the one or more virtual objects in response to detecting that the heart rate of the user has not changed subsequent to adjusting the object speed, the one or more processors configured to generate one or more images associated with the one or more other virtual objects; and a see-through display configured to display the one or more images such that the one or more other virtual objects are perceived to exist within the particular area.

15. The electronic device of claim 14, wherein:

the one or more processors configured to detect the user exiting the particular area and disable the one or more other virtual objects in response to detecting the user exiting the particular area.

16. The electronic device of claim 14, wherein:

the attraction comprises a ride at an amusement park.

17. The electronic device of claim 14, wherein:

the attraction comprises a museum exhibit.

18. The electronic device of claim 14, wherein:

the electronic device comprises a head-mounted display device.

* * * * *